US012739880B2

(12) United States Patent
Kim et al.

(10) Patent No.: US 12,739,880 B2
(45) Date of Patent: Sep. 15, 2026

(54) METHOD FOR PERFORMING SIDELINK COMMUNICATION BY TERMINAL IN WIRELESS COMMUNICATION SYSTEM AND DEVICE THEREFOR

(71) Applicant: LG ELECTRONICS INC., Seoul (KR)

(72) Inventors: Heejin Kim, Seoul (KR); Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 325 days.

(21) Appl. No.: 18/571,613

(22) PCT Filed: Jun. 17, 2022

(86) PCT No.: PCT/KR2022/008589
§ 371 (c)(1),
(2) Date: Dec. 18, 2023

(87) PCT Pub. No.: WO2022/265445
PCT Pub. Date: Dec. 22, 2022

(65) Prior Publication Data
US 2024/0292454 A1 Aug. 29, 2024

(30) Foreign Application Priority Data
Jun. 18, 2021 (KR) ........................ 10-2021-0079310

(51) Int. Cl.
*H04W 74/0808* (2024.01)
*H04W 92/18* (2009.01)

(52) U.S. Cl.
CPC ........ *H04W 74/0808* (2013.01); *H04W 92/18* (2013.01)

(58) Field of Classification Search
CPC . H04W 74/0808; H04W 92/18; H04W 16/14; H04W 72/40; H04W 4/40;
(Continued)

(56) References Cited

U.S. PATENT DOCUMENTS

2019/0116475 A1 4/2019 Lee et al.
2020/0314713 A1* 10/2020 Jung ...................... H04W 4/40
(Continued)

FOREIGN PATENT DOCUMENTS

EP 3813463 4/2021
KR 1020190098156 8/2019
(Continued)

OTHER PUBLICATIONS

European Patent Office Application Serial No. 22825368.8, Search Report dated May 12, 2025, 9 pages.
(Continued)

*Primary Examiner* — Brandon J Miller
(74) *Attorney, Agent, or Firm* — LEE, HONG, DEGERMAN, KANG & WAIMEY

(57) ABSTRACT

Disclosed are a method for performing first sidelink communication based on a first radio technology by a terminal in a wireless communication system according to various embodiments, and a device therefor. Disclosed are a method and a device therefor, the method comprising the steps of: receiving configuration information related to a first resource and a second resource; determining at least one resource for the first sidelink communication among the first resource and the second resource; and performing the first sidelink communication in the at least one resource, wherein the second resource is a resource shared between the first sidelink communication and second sidelink communication based on a second radio technology, and inclusion or non-inclusion of the second resource in the at least one resource
(Continued)

is determined on the basis of quality information related to the first resource.

13 Claims, 14 Drawing Sheets

(58) Field of Classification Search
CPC ..... H04W 24/08; H04W 72/54; H04W 88/06; H04W 72/02; H04W 72/1215; H04W 72/25; H04W 72/542; Y02D 30/70
See application file for complete search history.

(56) References Cited

U.S. PATENT DOCUMENTS

2021/0014893 A1* 1/2021 Park ...................... H04L 5/0094
2021/0037420 A1* 2/2021 Gulati ................... H04W 24/08
2021/0153169 A1* 5/2021 Lin ......................... H04L 5/006
2021/0274474 A1* 9/2021 Cheng ............... H04W 72/0446

FOREIGN PATENT DOCUMENTS

WO 2020032698 2/2020
WO WO-2020054812 A1 * 3/2020 ............ H04W 72/02
WO 2020092706 5/2020

OTHER PUBLICATIONS

3rd Generation Partnership Project (3GPP), "Technical Specification Group Radio Access Network; Overall description of Radio Access Network (RAN) aspect for Vehicle-to-everything (V2X) based on LTE and NR (Release 16)," 3GPP R 37.985 V16.0.0, Jun. 2020, 35 pages.
PCT International Application No. PCT/KR2022/008589, International Search Report dated Oct. 4, 2022, 6 pages.
Nokia et al., "Discussion on SL radio link management," 3GPP TSG-RAN WG2 Meeting #108, R2-1915186, Nov. 2019, 3 pages.
3rd Generation Partnership Project (3GPP), "Technical Specification Group Radio Access Network; NR; NR and NG-RAN Overall Description; Stage 2 (Release 16)," 3GPP TS 38.300 V16.5.0, Mar. 2021, 151 pages.

* cited by examiner (a)

(b)

(a)

(b)

(a)

(b)

(c)

METHOD FOR PERFORMING SIDELINK COMMUNICATION BY TERMINAL IN WIRELESS COMMUNICATION SYSTEM AND DEVICE THEREFOR

CROSS-REFERENCE TO RELATED APPLICATION(S)

This application is the National Stage filing under 35 U.S.C. 371 of International Application No. PCT/KR2022/008589, filed on Jun. 17, 2022, which claims the benefit of earlier filing date and right of priority to Korean Application No. 10-2021-0079310, filed on Jun. 18, 2021, the contents of which are all incorporated by reference herein in their entirety.

TECHNICAL FIELD

The present disclosure relates to a method of performing sidelink communication by a user equipment (UE) in a wireless communication system and device therefor.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

SUMMARY

The present disclosure aims to provide a method and device for enabling efficient coexistence between heterogeneous communication technologies (e.g., Long Term Evolution vehicle-to-everything (LTE-V2X) and New Radio vehicle-to-everything (NR-V2X)) while efficiently using resources shared between the heterogeneous communication technologies when the same frequency band is used between the heterogeneous communication technologies.

It will be appreciated by those of ordinary skill in the art to which the embodiment(s) pertain that the objects that could be achieved with the embodiment(s) are not limited to what has been particularly described hereinabove and the above and other objects will be more clearly understood from the following detailed description.

In an aspect of the present disclosure, provided herein is a method of performing, by a user equipment (UE), first sidelink communication based on a first wireless technology in a wireless communication system. The method may include: receiving configuration information related to a first resource and a second resource: determining at least one resource for the first sidelink communication among the first resource and the second resource; and performing the first sidelink communication on the at least one resource. The second resource may be a resource shared between the first sidelink communication and second sidelink communication based on a second wireless technology. Whether the second resource is included in the at least one resource is determined based on quality information related to the first resource.

Alternatively, the quality information may be related to a channel busy ratio (CBR) measured for the first resource or a channel occupancy ratio (CR) measured for the first resource.

Alternatively, based on that the CBR measured for the first resource or the CR measured for the first resource is less than or equal to a predetermined threshold quality, the at least one resource may include the second resource.

Alternatively, the quality information may be related to at least one of a number of negative acknowledgment (NACK) occurrences, a number of discontinuous transmission (DTX) occurrences, or a number of radio link failure (RLF) occurrences.

Alternatively, based on that the number of NACK occurrences related to the first resource, the number of DTX occurrences related to the first resource, or the number of RLF occurrences related to the first resource is more than a predetermined threshold number, the at least one resource may include the second resource.

Alternatively, the quality information may be related to a rate or frequency at which reselection of a booking process related to sidelink communication based on the first wireless technology performed on the first resource is triggered.

Alternatively, the quality information may be related to a rate or frequency at which reselection of a booking process related to the first sidelink communication based on the first wireless technology performed on the first resource is triggered.

Alternatively, the method may further include: obtaining measurement information for the second resource; and determining whether the measurement information satisfies predetermined conditions.

Alternatively, the at least one resource may include the second resource based on (i) that the measurement information satisfies the predetermined conditions and (ii) that the quality information is less than or equal to a predetermined threshold quality.

Alternatively, the measurement information may include at least one of a sidelink received signal strength indicator (S-RSSI), a channel busy ratio (CBR), a channel occupancy ratio (CR), or a reference signal received power (RSRP), which are all measured for the second resource.

Alternatively, based on that the quality information is less than or equal to a predetermined threshold quality, the first sidelink communication may be performed on the second resource based on a numerology related to the second sidelink communication or a synchronization reference related to the second sidelink communication.

Alternatively, the first wireless technology may be New Radio (NR), and the second wireless technology may be Long Term Evolution (LTE). The first resource may be a resource configured to be available only for the first sidelink communication.

In another aspect of the present disclosure, provided herein is a method of receiving, by a UE, a first sidelink signal based on a first wireless technology in a wireless communication system. The method may include: receiving configuration information related to a first resource and a second resource; and receiving the first sidelink signal on at least one resource of the first resource and the second resource. The second resource may be a resource shared between first sidelink communication based on the first wireless technology and second sidelink communication based on a second wireless technology. Whether the second resource is included in the at least one resource is determined based on quality information related to the first resource.

In another aspect of the present disclosure, provided herein is a UE configured to perform first sidelink communication based on a first wireless technology in a wireless communication system. The UE may include: a radio frequency (RF) transceiver; and a processor connected to the RF transceiver. The processor may be configured to: control the RF transceiver to receive configuration information related to a first resource and a second resource; determine at least one resource for the first sidelink communication among the first resource and the second resource; and perform the first sidelink communication on the at least one resource. The second resource may be a resource shared between the first sidelink communication and second sidelink communication based on a second wireless technology. Whether the second resource is included in the at least one resource is determined based on quality information related to the first resource.

In another aspect of the present disclosure, provided herein is a UE configured to receive a first sidelink signal based on a first wireless technology in a wireless communication system. The UE may include: an RF transceiver; and a processor connected to the RF transceiver. The processor may be configured to: control the RF transceiver to receive configuration information related to a first resource and a second resource; and receive the first sidelink signal on at least one resource of the first resource and the second resource. The second resource may be a resource shared between first sidelink communication based on the first wireless technology and second sidelink communication based on a second wireless technology. Whether the second resource is included in the at least one resource is determined based on quality information related to the first resource.

In another aspect of the present disclosure, provided herein is a chipset configured to perform first sidelink communication based on a first wireless technology in a wireless communication system. The chipset may include: at least one processor; and at least one memory operably connected to the at least one processor and configured to, when executed, cause the at least one processor to perform operations. The operations may include: receiving configuration information related to a first resource and a second resource: determining at least one resource for the first sidelink communication among the first resource and the second resource; and performing the first sidelink communication on the at least one resource. The second resource may be a resource shared between the first sidelink communication and second sidelink communication based on a second wireless technology. Whether the second resource is included in the at least one resource is determined based on quality information related to the first resource.

In a further aspect of the present disclosure, provided herein is a computer-readable storage medium including at least one computer program for performing operations to perform first sidelink communication based on a first wireless technology in a wireless communication system. The at least one computer program may be configured to cause at least one processor to perform an operation of transmitting a sidelink signal. The at least one computer program may be stored on the computer-readable storage medium. The operations may include: receiving configuration information related to a first resource and a second resource; determining at least one resource for the first sidelink communication among the first resource and the second resource; and performing the first sidelink communication on the at least one resource. The second resource may be a resource shared between the first sidelink communication and second sidelink communication based on a second wireless technology. Whether the second resource is included in the at least one resource is determined based on quality information related to the first resource.

According to various embodiments, predefined conditions may be required to be satisfied in the usage of resources shared between heterogeneous communication technologies (e.g., Long Term Evolution vehicle-to-everything (LTE-V2X) and New Radio vehicle-to-everything (NR-V2X)) in the same frequency band, thereby enabling efficient coexistence between the heterogeneous communication technologies.

In addition, interference between the heterogeneous communication technologies on the shared resources may be minimized by predefining a numerology for the use of the shared resources, thereby establishing an environment for the efficient coexistence between the heterogeneous communication technologies.

Moreover, interference between the heterogeneous communication technologies on the shared resources may be minimized by predefining a synchronization reference for the use of the shared resources, thereby establishing an environment for the efficient coexistence between the heterogeneous communication technologies.

Accordingly, the heterogeneous communication technologies may use the same frequency band more efficiently.

For V2X communication that demands higher reliability and latency requirements, the use of the shared resources may be allowed when the predefined conditions are satisfied, thereby effectively ensuring the required reliability and latency requirements even with limited resources.

Effects to be achieved by embodiment(s) are not limited to what has been particularly described hereinabove and other effects not mentioned herein will be more clearly understood by persons skilled in the art to which embodiment(s) pertain from the following detailed description.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

DETAILED DESCRIPTION

Figure 1:
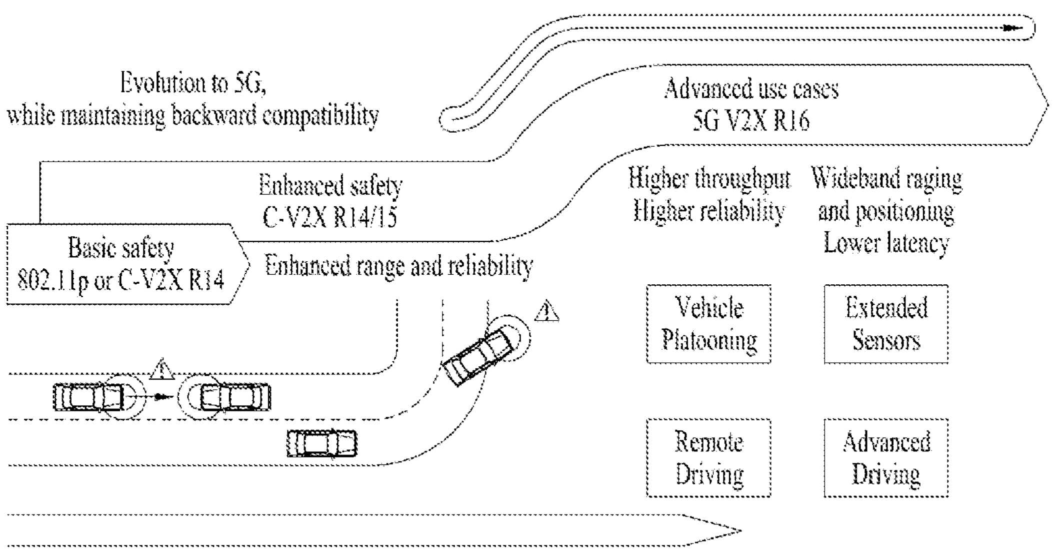
FIG. 1 is a diagram for explaining by comparing V2X communication based on RAT before NR and V2X communication based on NR.

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

For clarity of explanation, LTE-A or 5G NR is mainly described, but the technical spirit of the embodiment(s) is not limited thereto.

Figure 2:
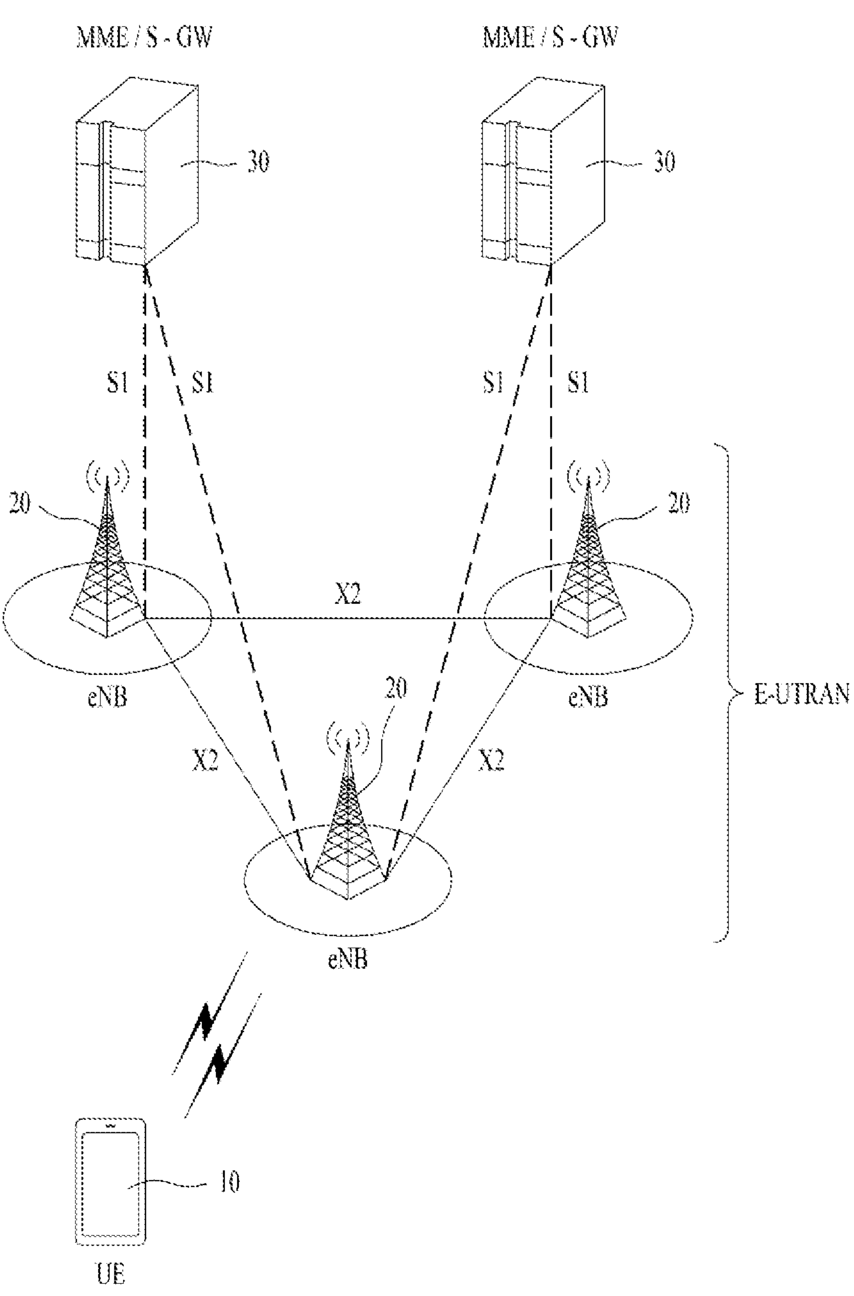
FIG. 2 illustrates the structure of an LTE system to which embodiment(s) are applicable.

FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
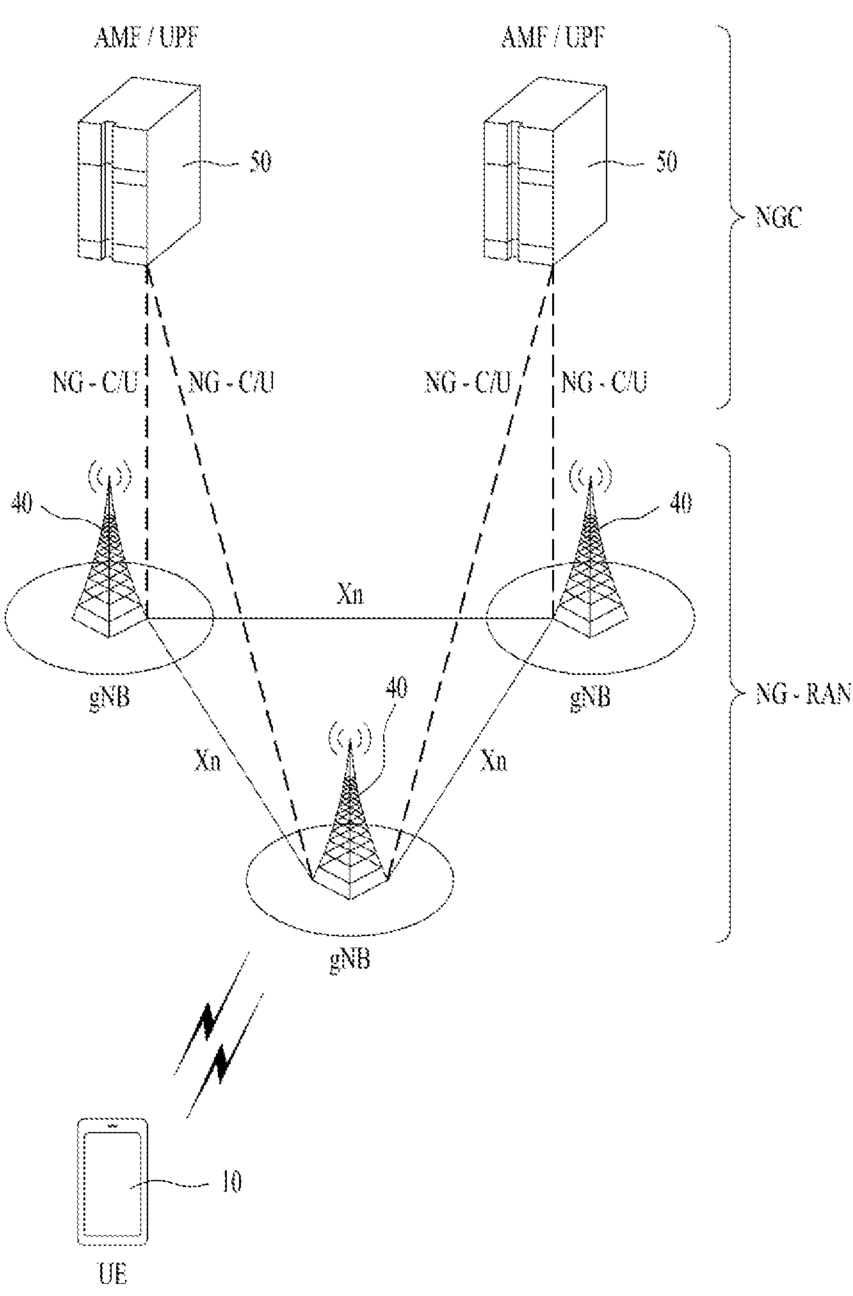
FIG. 3 illustrates the structure of an NR system to which embodiment(s) are applicable.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
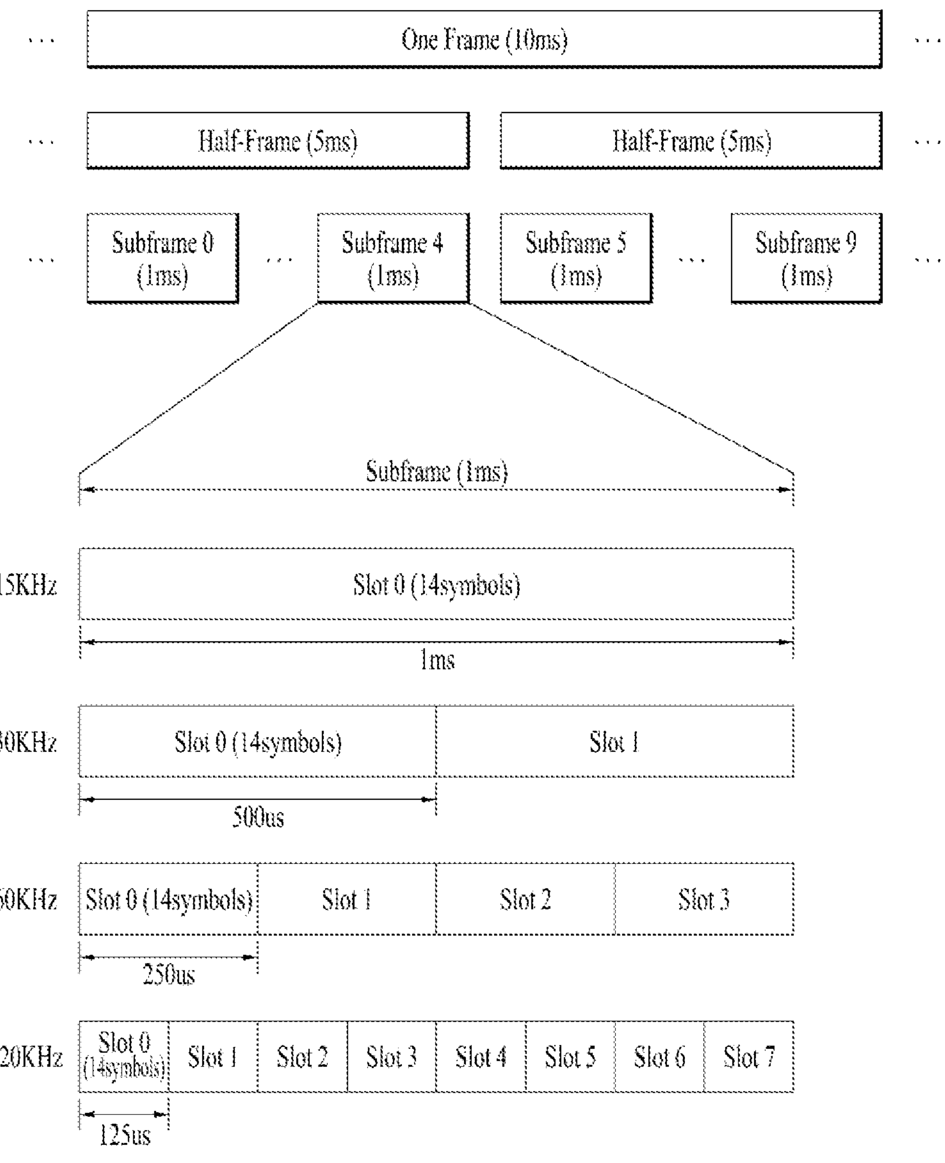
FIG. 4 illustrates the structure of an NR radio frame to which embodiment(s) are applicable.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration u in the NCP case.

TABLE 1

| SCS (15*2u) | $N^{slot}_{symb}$ | $N^{frame,u}_{slot}$ | $N^{subframe,u}_{slot}$ |
|---|---|---|---|
| 15 kHz (u = 0) | 14 | 10 | 1 |
| 30 kHz (u = 1) | 14 | 20 | 2 |
| 60 kHz (u = 2) | 14 | 40 | 4 |
| 120 kHz (u = 3) | 14 | 80 | 8 |
| 240 kHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame,u}_{slot}$ | $N^{subframe,u}_{slot}$ |
|---|---|---|---|
| 60 kHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHZ (or 5850 MHZ, 5900 MHz, 5925 MHZ, etc.) or higher. For example, the frequency band of 6 GHZ (or 5850 MHZ, 5900 MHZ, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
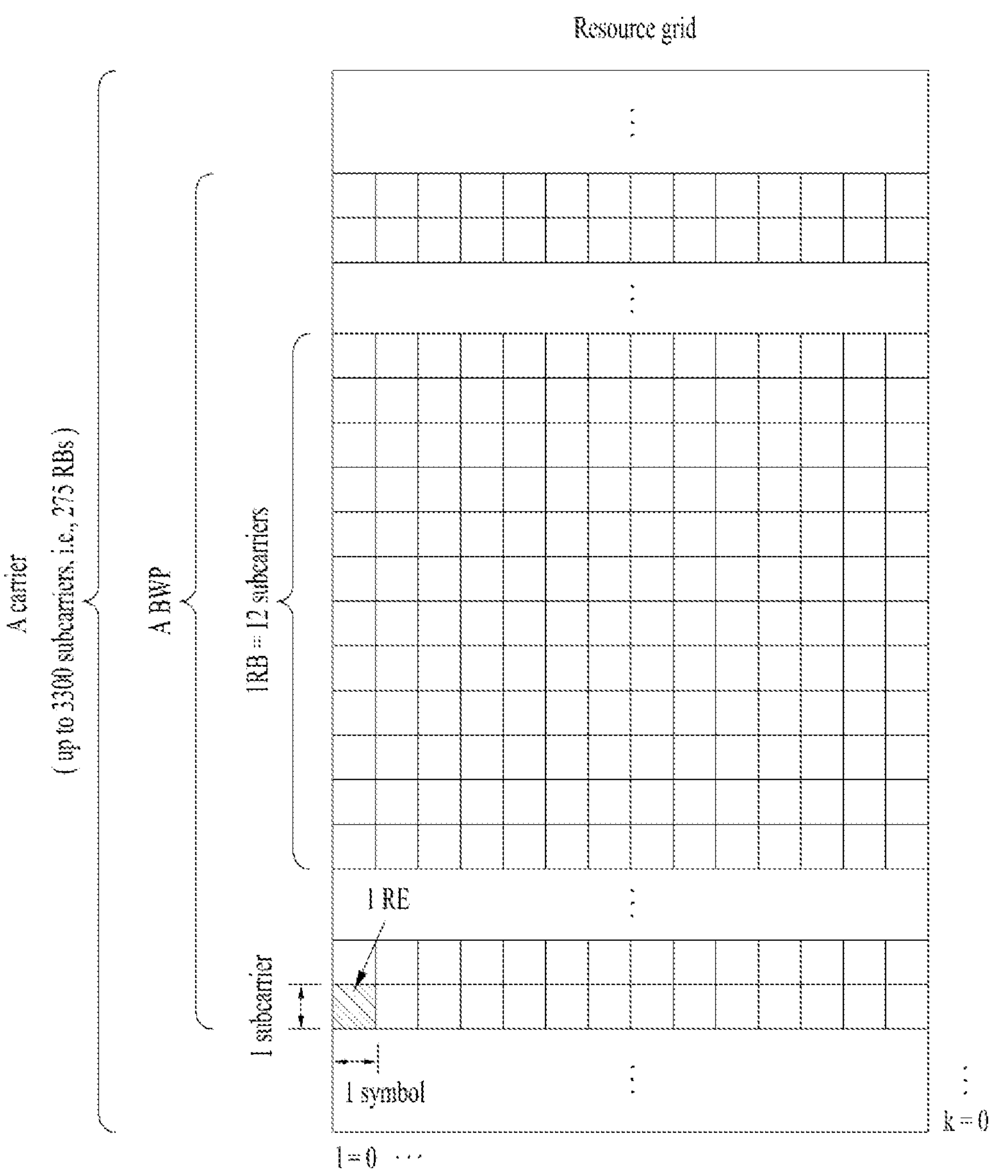
FIG. 5 illustrates the slot structure of an NR frame to which embodiment(s) are applicable.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 6:
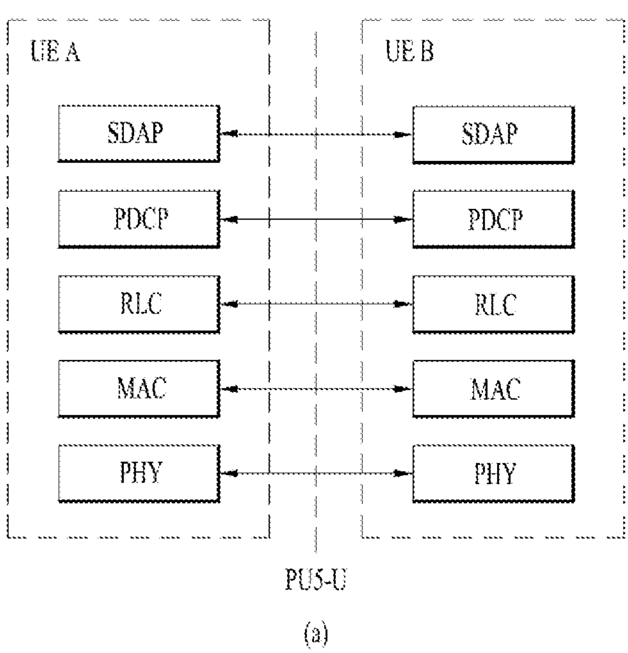
FIG. 6 illustrates a radio protocol architecture for SL communication.
Figure 6:
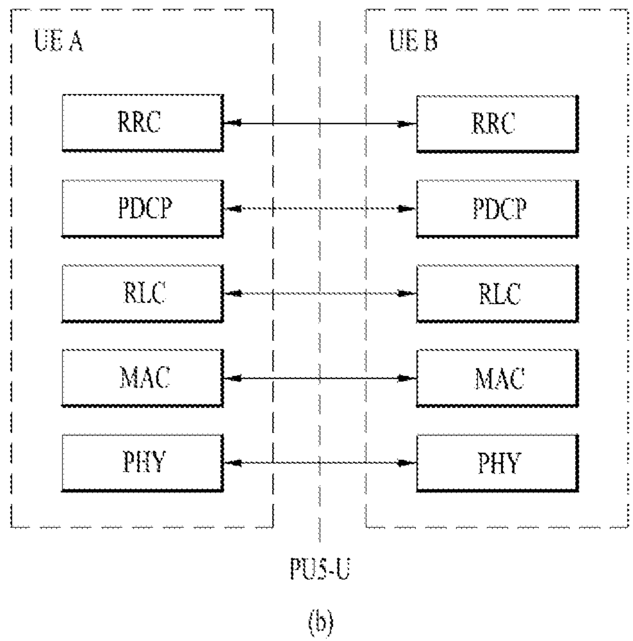

FIG. 6 illustrates a radio protocol architecture for SL communication. Specifically, FIG. 6-(*a*) shows a user plane protocol stack of NR, and FIG. 6-(*b*) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be pre-configured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 KHz in FR1, the transmitting UE may transmit one, two, or four S-SSBs to the receiving UE within one S-SSB transmission period.

For example, when the SCS is 60 KHz in FR2, the transmitting UE may transmit 1, 2, 4, 8, 16 or 32 S-SSBs to the receiving UE within one S-SSB transmission period. For example, when SCS is 120 KHz in FR2, the transmitting UE may transmit 1, 2, 4, 8, 16, 32 or 64 S-SSBs to the receiving UE within one S-SSB transmission period.

When the SCS is 60 KHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
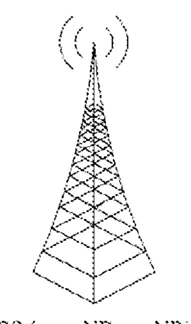
FIG. 7 illustrates UEs performing V2X or SL communication.
Figure 7:
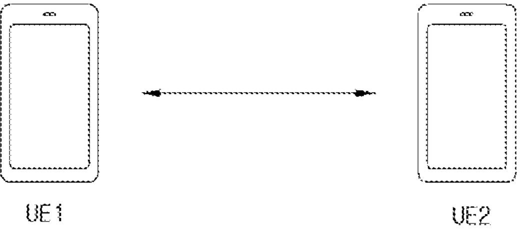

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200. For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
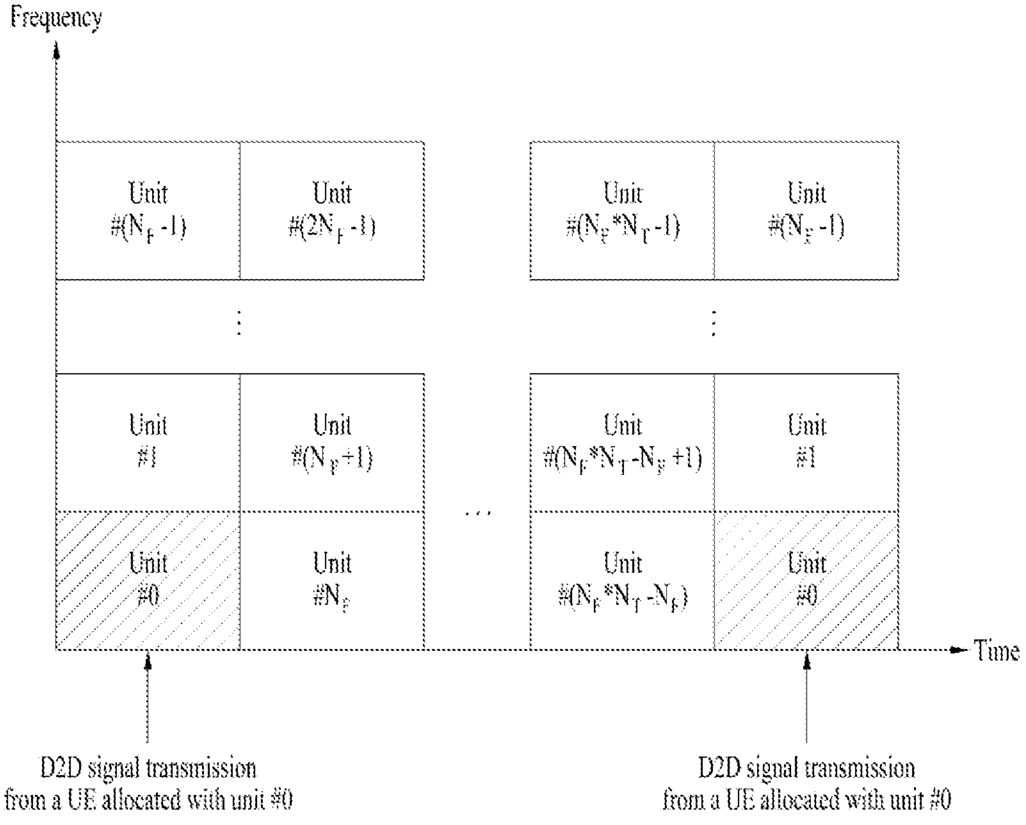
FIG. 8 illustrates resource units for V2X or SL communication.

FIG. 8 illustrates resource units for V2X or SL communication.

Referring to FIG. 8, the frequency resources of a resource pool may be divided into $N_F$ sets, and the time resources of the resource pool may be divided into $N_T$ sets. Accordingly, a total of $N_F{*}N_T$ resource units may be defined in the resource pool. FIG. 8 shows an exemplary case where the resource pool is repeated with a periodicity of NT subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Hereinafter, resource allocation in the SL will be described.

Figure 9:
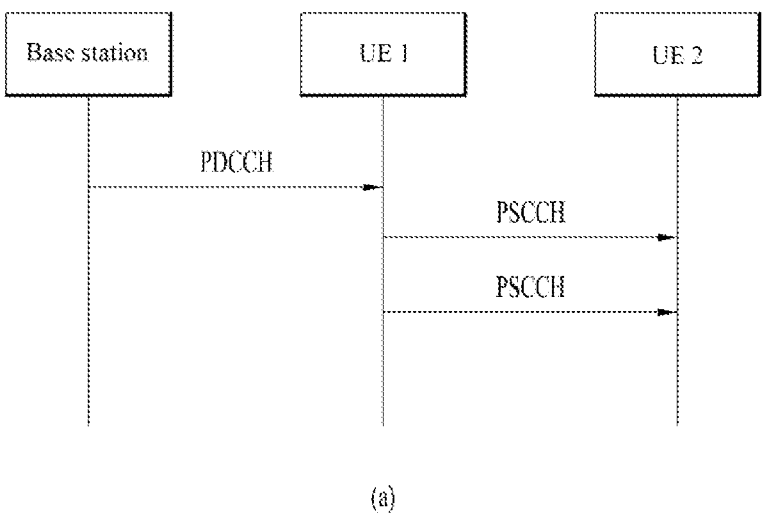
FIG. 9 illustrates a procedure in which UEs perform V2X or SL communication according to a transmission mode.
Figure 9:
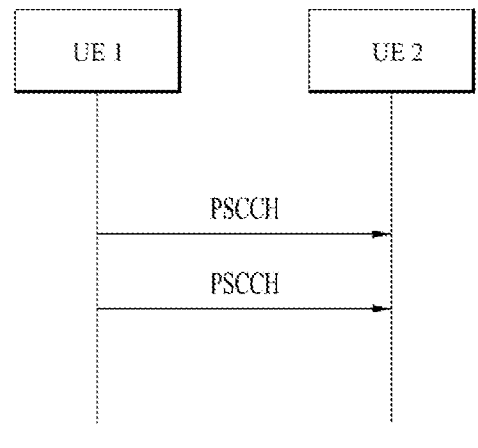

FIG. 9 illustrates a procedure in which UEs perform V2X or SL communication according to a transmission mode. In various embodiments of the present disclosure, the transmission mode may be referred to as a mode or a resource allocation mode. Hereinafter, for simplicity, the transmission mode in LTE may be referred to as an LTE transmission mode, and the transmission mode in NR may be referred to as an NR resource allocation mode.

For example, FIG. 9-(*a*) illustrates a UE operation related to LTE transmission mode 1 or LTE transmission mode 3. Alternatively, for example, FIG. 9-(*a*) illustrates a UE operation related to NR resource allocation mode 1. For example, LTE transmission mode 1 may be applied to general SL communication, and LTE transmission mode 3 may be applied to V2X communication.

For example, FIG. 9-(*b*) illustrates a UE operation related to LTE transmission mode 2 or LTE transmission mode 4. Alternatively, for example, FIG. 9-(*b*) illustrates a UE operation related to NR resource allocation mode 2.

Referring to FIG. 9-(*a*), in LTE transmission mode 1, LTE transmission mode 3 or NR resource allocation mode 1, the BS may schedule an SL resource to be used by the UE for SL transmission. For example, the BS may perform resource scheduling for UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 on a physical sidelink control channel (PSCCH), and then transmit data which is based on the SCI to UE 2 on a physical sidelink shared channel (PSSCH).

For example, in NR resource allocation mode 1, the UE may be provided with or allocated resources for one or more SL transmissions of a transport block (TB) from the BS through a dynamic grant. For example, the BS may provide a resource for transmission of the PSCCH and/or PSSCH to the UE using the dynamic grant. For example, the transmitting UE may report the SL hybrid automatic repeat request (HARQ) feedback received from the receiving UE to the BS. In this case, the PUCCH resource and timing for reporting the SL HARQ feedback to the BS may be determined based on an indication in the PDCCH through the BS is to allocate a resource for SL transmission.

For example, DCI may include a slot offset between DCI reception and the first SL transmission scheduled by the DCI. For example, the minimum gap between the DCI scheduling a SL transmission resource and the first scheduled SL transmission resource may not be shorter than the processing time of the corresponding UE.

For example, in NR resource allocation mode 1, the UE may be periodically provided with or allocated a resource set from the BS for a plurality of SL transmissions through a configured grant. For example, the configured grant may include configured grant type 1 or configured grant type 2. For example, the UE may determine a TB to be transmitted in each occasion indicated by a given configured grant.

For example, the BS may allocate SL resources to the UE on the same carrier, and may allocate SL resources to the UE on different carriers.

For example, an NR BS may control LTE-based SL communication. For example, the NR BS may transmit NR DCI to the UE to schedule an LTE SL resource. In this case, for example, a new RNTI for scrambling the NR DCI may be defined. For example, the UE may include an NR SL module and an LTE SL module.

For example, after the UE including the NR SL module and the LTE SL module receives NR SL DCI from the gNB, the NR SL module may transform the NR SL DCI to LTE DCI type 5A, and the NR SL module may deliver LTE DCI type 5A to the LTE SL module in units of X ms. For example, the LTE SL module may apply activation and/or release to the first LTE subframe Z ms after the LTE SL module receives LTE DCI format 5A from the NR SL module. For example, the X may be dynamically indicated using a field of DCI. For example, the minimum value of X may depend on the UE capability. For example, the UE may report a single value according to the UE capability. For example, X may be a positive number.

Referring to FIG. 9-(*b*), in LTE transmission mode 2, LTE transmission mode 4, or NR resource allocation mode 2, the UE may determine AN SL resource within the SL resources configured by the BS/network or the preconfigured SL resources. For example, the configured SL resources or the preconfigured SL resources may be a resource pool. For example, the UE may autonomously select or schedule a resource for SL transmission. For example, the UE may autonomously select a resource within the configured resource pool to perform SL communication. For example, the UE may select a resource within a selection window by performing a sensing and resource (re)selection procedure. For example, the sensing may be performed on a per sub-channel basis. In addition, UE 1, which has selected a resource within the resource pool, may transmit SCI to UE 2 through the PSCCH, and then transmit data, which is based on the SCI, to UE 2 through the PSSCH.

For example, a UE may assist in selecting an SL resource for another UE. For example, in NR resource allocation mode 2, the UE may receive a configured grant for SL transmission. For example, in NR resource allocation mode 2, the UE may schedule SL transmission of another UE. For example, in NR resource allocation mode 2, the UE may reserve an SL resource for blind retransmission.

For example, in NR resource allocation mode 2, UE 1 may indicate the priority of SL transmission to UE 2 using the SCI. For example, UE 2 may decode the SCI. UE 2 may perform sensing and/or resource (re)selection based on the priority. For example, the resource (re)selection procedure may include an operation of identifying candidate resources in a resource selection window by UE 2, and an operation of selecting, by UE 2, a resource for (re)transmission from among the identified candidate resources. For example, the resource selection window may be a time interval during which the UE selects the resource for SL transmission. For example, after UE 2 triggers resource (re)selection, the resource selection window may start at $T1\geq 0$. The resource selection window may be limited by the remaining packet delay budget of UE 2. For example, in the operation of identifying the candidate resources in the resource selection window by UE 2, a specific resource may be indicated by the SCI received by UE 2 from UE 1. When the L1 SL RSRP measurement value for the specific resource exceeds an SL RSRP threshold, UE 2 may not determine the specific resource as a candidate resource. For example, the SL RSRP threshold may be determined based on the priority of the SL transmission indicated by the SCI received by UE 2 from UE 1 and the priority of the SL transmission on the resource selected by UE 2.

For example, the L1 SL RSRP may be measured based on an SL demodulation reference signal (DMRS). For example, one or more PSSCH DMRS patterns may be configured or preconfigured for each resource pool in the time domain. For example, PDSCH DMRS configuration type 1 and/or type 2 may be the same as or similar to the frequency domain pattern of the PSSCH DMRS. For example, the exact DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, based on the sensing and resource (re)selection procedure, the transmitting UE may perform initial transmission of a TB without reservation. For example, based on the sensing and resource (re)selection procedure, using the SCI associated with a first TB, the transmitting UE may reserve the SL resource for initial transmission of a second TB.

For example, in NR resource allocation mode 2, the UE may reserve a resource for feedback-based PSSCH retransmission through signaling related to previous transmission of the same TB. For example, the maximum number of SL resources reserved by one transmission including the current transmission may be 2, 3, or 4. For example, the maximum number of SL resources may be the same regardless of whether HARQ feedback is enabled. For example, the maximum number of HARQ (re)transmissions for one TB may be limited by configuration or pre-configuration. For example, the maximum number of HARQ (re)transmissions may be up to 32. For example, when the configuration or pre-configuration is not present, the maximum number of HARQ (re)transmissions may be unspecified. For example, the configuration or pre-configuration may be for the transmitting UE. For example, in NR resource allocation mode 2, HARQ feedback for releasing resources not used by the UE may be supported.

For example, in NR resource allocation mode 2, the UE may indicate to another UE one or more sub-channels and/or slots used by the UE, using the SCI. For example, the UE may indicate to another UE one or more sub-channels and/or slots reserved by the UE for PSSCH (re)transmission, using SCI. For example, the minimum allocation unit of the SL resource may be a slot. For example, the size of the sub-channel may be configured for the UE or may be preconfigured.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2nd SCI. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH, or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

- PSSCH and/or PSCCH related resource allocation information, for example, the positions/number of time/frequency resources, resource reservation information (e.g., periodicity); and/or
- SL CSI report request indicator or SL (L1) RSRP (and/or SL (L1) RSRQ and/or SL (L1) RSSI) report request indicator; and/or
- SL CSI transmission indicator (or SL (L1) RSRP (and/or SL (L1) RSRQ and/or SL (L1) RSSI) information transmission indicator) (on PSSCH); and/or
- MCS information; and/or
- transmit power information; and/or
- L1 destination ID information and/or L1 source ID information; and/or
- SL HARQ process ID information; and/or
- new data indicator (NDI) information; and/or
- redundancy version (RV) information; and/or
- (transmission traffic/packet related) Quality of Service (QOS) information; e.g., priority information; and/or
- SL CSI-RS transmission indicator or information on the number of (transmitted) SL CSI-RS antenna ports;
- Location information about the transmitting UE or location (or distance/area) information about a target receiving UE (to which a request for SL HARQ feedback is made); and/or
- information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, synchronization acquisition by an SL UE will be described.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Hybrid Automatic Repeat Request (HARQ) is the combination of FEC and ARQ, and can improve performance by checking whether data received by a physical layer contains an error that cannot be decoded, and requesting retransmission if an error occurs.

In case of sidelink unicast and groupcast, HARQ feedback and HARQ combining in a physical layer may be supported. For example, when an Rx UE operates in resource allocation mode 1 or 2, the Rx UE may receive PSSCH from a Tx UE, and the Rx UE may transmit HARQ-ACK feedback on the PSSCH to the Tx UE using a Sidelink Feedback Control Information (SFCI) format through Physical Sidelink Control Channel (PSFCH).

When side link HARQ feedback is enabled for unicast, in case of a non-Code Block Group (non-CBG) operation, when the Rx UE successfully decodes a corresponding transport block, the Rx UE may generate HARQ-ACK. Then, the Rx UE may transmit the HARQ-ACK to the Tx UE. After the Rx UE has decoded an associated PSCCH targeting the Rx UE, if the Rx UE fails to successfully decode the corresponding transport block, the Rx UE may generate HARQ-NACK. Then, the Rx UE may transmit the HARQ-NACK to the Tx UE.

When side link HARQ feedback is enabled for groupcast, a UE may determine whether to send HARQ feedback based on a Tx-Rx distance and/or RSRP. In case of a non-CBG operation, two kinds of options may be supported.

(1) Option 1: When an Rx UE fails to decode a corresponding transport block after decoding an associated PSCCH, the Rx UE may transmit HARQ-NACK on PSFCH. Otherwise, the Rx UE may not transmit a signal on PSFCH.

(2) Option 2: When an Rx UE successfully decodes a corresponding transport block, the Rx UE may transmit HARQ-ACK on PSFCH. When the Rx UE fails to decode the corresponding transport block successfully after decoding an associated PSCCH targeting the Rx UE, the Rx UE may transmit HARQ-NACK on PSFCH.

In case of mode 1 resource allocation, the time between HARQ feedback transmission on PSFCH and PSSCH may be set (in advance). In case of unicast and groupcast, if retransmission in sidelink is required, it may be indicated to a BS by an in-coverage UE that uses PUCCH. A Tx UE may transmit an indication to a serving BS of the Tx UE in a form such as a Scheduling Request/Buffer Status Report (SR/BSR) rather than a form of HARQ ACK/NACK. In addition, even if the BS does not receive the indication, the BS may schedule a side link retransmission resource to the UE.

In case of mode 2 resource allocation, the time between HARQ feedback transmission on PSFCH and PSSCH may be set (in advance).

Hereinafter, sidelink congestion control will be described.

When a UE determines a sidelink Tx resource by itself, the UE also determines a size and frequency of a resource used by the UE. Of course, due to constraints from a network, etc., using a resource size or frequency of a predetermined level or higher may be limited. However, when all UEs use relatively large resources in a situation that many UEs are concentrated in a specific area at a specific timing, overall performance may be considerably due to mutual interference.

Accordingly, a UE needs to observe a channel situation. If it is determined that an excessive amount of resources are being consumed, it is preferable that the UE takes an operation in the form of reducing its own resource use. In the present specification, this may be defined as Congestion Control (CR). For example, a UE may determine whether the energy measured in a unit time/frequency resource is equal to or higher than a predetermined level, and adjust an amount and frequency of its Tx resource according to a ratio of the unit time/frequency resource from which the energy equal to or higher than the predetermined level is observed. In the present specification, the ratio of the time/frequency resources from which the energy equal to or higher than the predetermined level is observed may be defined as a Channel Busy Ratio (CBR). The UE may measure the CBR with respect to a channel/frequency. Additionally, the UE may transmit the measured CBR to a network/BS.

Figure 10:
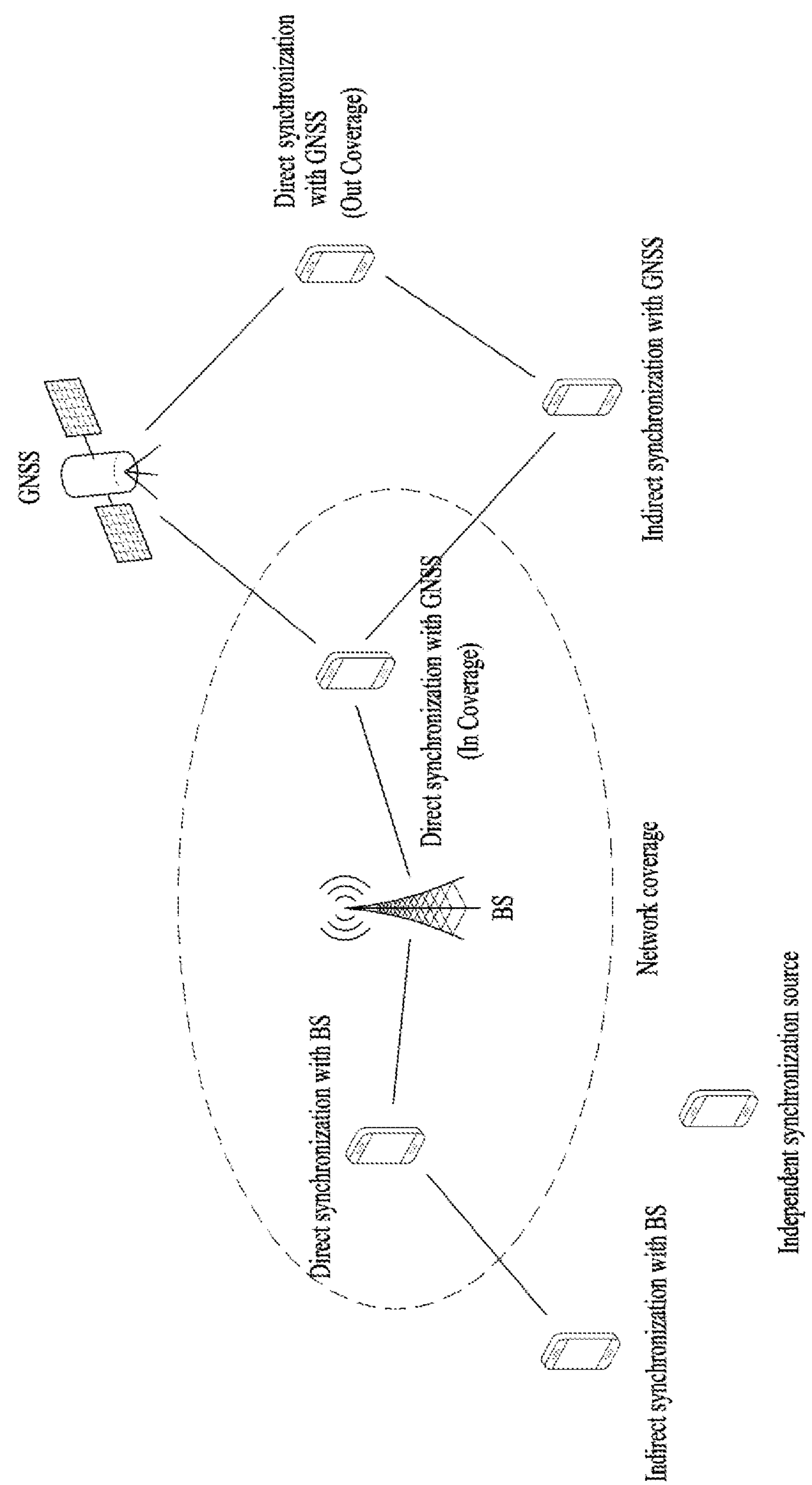
FIG. 10 illustrates a V2X synchronization source or synchronization reference to which embodiments(s) are applicable.

FIG. 10 illustrates a V2X synchronization source or reference to which the present disclosure is applicable.

Referring to FIG. 10, in V2X, a UE may be synchronized with a global navigation satellite system (GNSS) directly or indirectly through a UE (within or out of network coverage) directly synchronized with the GNSS. When the GNSS is configured as a synchronization source, the UE may calculate a direct subframe number (DFN) and a subframe number by using a coordinated universal time (UTC) and a (pre)determined DFN offset.

Alternatively, the UE may be synchronized with a BS directly or with another UE which has been time/frequency synchronized with the BS. For example, the BS may be an eNB or a gNB. For example, when the UE is in network coverage, the UE may receive synchronization information provided by the BS and may be directly synchronized with the BS. Thereafter, the UE may provide synchronization information to another neighboring UE. When a BS timing is set as a synchronization reference, the UE may follow a cell associated with a corresponding frequency (when within the cell coverage in the frequency), a primary cell, or a serving cell (when out of cell coverage in the frequency), for synchronization and DL measurement.

The BS (e.g., serving cell) may provide a synchronization configuration for a carrier used for V2X or sidelink communication. In this case, the UE may follow the synchronization configuration received from the BS. When the UE fails in detecting any cell in the carrier used for the V2X or sidelink communication and receiving the synchronization configuration from the serving cell, the UE may follow a predetermined synchronization configuration.

Alternatively, the UE may be synchronized with another UE which has not acquired synchronization information directly or indirectly from the BS or GNSS. A synchronization source and a preference may be preset for the UE. Alternatively, the synchronization source and the preference may be configured for the UE by a control message provided by the BS.

A sidelink synchronization source may be related to a synchronization priority. For example, the relationship between synchronization sources and synchronization priorities may be defined as shown in Tables 5 and 6. Tables 5 and 6 are merely an example, and the relationship between synchronization sources and synchronization priorities may be defined in various manners.

TABLE 5

| Priority | GNSS-based synchronization | BS-based synchronization (eNB/gNB-based synchronization) |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | All other UEs | GNSS |
| P4 | N/A | All UEs directly synchronized with GNSS |
| P5 | N/A | All UEs indirectly synchronized with GNSS |
| P6 | N/A | All other UEs |

TABLE 6

| Priority | GNSS-based synchronization | eNB/gNB-based synchronization |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | BS | GNSS |
| P4 | All UEs directly synchronized with BS | All UEs directly synchronized with GNSS |
| P5 | All UEs indirectly synchronized with BS | All UEs indirectly synchronized with GNSS |
| P6 | Remaining UE(s) with low priority | Remaining UE(s) with low priority |

In Table 5 or Table 6, PO may denote the highest priority, and P6 may denote the lowest priority. In Table 5 or Table 6, the BS may include at least one of a gNB or an eNB.

Whether to use GNSS-based synchronization or BS-based synchronization may be (pre)determined. In a single-carrier operation, the UE may derive its transmission timing from an available synchronization reference with the highest priority.

Coexistence of LTE and NR in Same Band

In some cases, different wireless access technologies need to share the same frequency band. For example, LTE-V2X and NR-V2X may coexist while sharing the same vehicle communication frequency band (e.g., 5.9 GHZ (Intelligent Transport Systems) ITS band). While LTE-V2X (LTE-SL) primarily supports basic vehicle safety services, NR-V2X (NR-SL) may provide more advanced vehicle communication services. These advanced vehicle communication services often demand low latency and high reliability and may require high data transmission rates as well. Therefore, to support such services through NR-V2X (NR-SL), more (time and/or frequency) transmission resources may be required compared to LTE-V2X (LTE-SL). However, since transmission resources are limited, there is a need for methods to enable efficient coexistence between two heterogeneous communication technologies on constrained resources.

Assuming that NR-V2X (NR-SL) communication and LTE-V2X (LTE-SL) communication are performed and there are transmission resources available for both technologies (i.e., LTE/NR SL shared resources) and transmission resources available for only specific technologies (e.g., LTE SL ONLY resources or NR SL ONLY resources), the present disclosure proposes definitions of the transmission resources (e.g., LTE/NR SL shared resources, LTE SL ONLY resources, and NR SL ONLY resources), conditions under which the two technologies (e.g., NR-V2X (NR-SL) and LTE-V2X (LTE-SL)) are allowed for LTE/NR SL communication on the transmission resources, and detailed UE operations when the two technologies are allowed for transmission/reception on LTE/NR SL shared resources.

Herein, the term "transmission resource" may refer to a carrier, channel, resource pool, BWP, etc. Specifically, in the specification, the term "resource" may be interpreted (extended) to refer to at least one of a carrier, channel, resource pool, and/or BWP. In addition, in the specification, the term "configuration" may be interpreted (extended) to refer to a form in which the BS transmits related information to the UE in a predetermined signal (e.g., system information block (SIB), RRC, and so on) (and/or a form in which the UE obtains related information from a pre-configuration). Furthermore, the applicability of proposed rules in the specification (and/or related parameters) may be configured and/or applied independently (or limitedly/selectively) for at least one of a resource pool, a service type (and/or priority), (service-related) QoS requirements (e.g., latency, reliability, etc.), a congestion level (within a resource pool), a periodic (and/or aperiodic) resource reservation scheme, a cast type (e.g. broadcast, groupcast, unicast, etc.), HARQ feedback enabled (and/or disabled) medium access control (MAC) protocol data unit/transport block (PDU/TB) transmission, NR-based (and/or LTE-based) SL communication, and/or an SL mode (e.g. MODE 1, MODE 2, etc.)

Herein, LTE SL and/or LTE SL transmission and reception may refer to SL communication based on LTE, which includes the transmission of signaling/information such as a PSCCH, PSSCH, PSSS, SSSS, etc. based on LTE. In addition, NR SL and/or NR SL transmission and reception may refer to SL communication based on NR, which includes the transmission of signaling/information such as a PSCCH, PSSCH, PSFCH, SSB, PSSS, SSSS, etc. based on NR.

Figure 11:
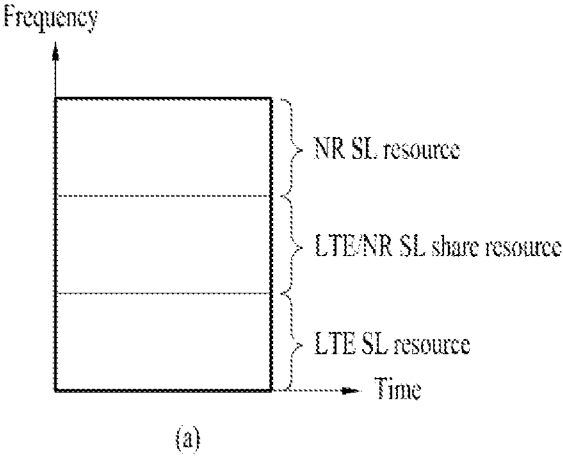
FIG. 11 is a diagram for explaining Long Term Evolution/New Radio (LTE/NR) sidelink (SL) shared resources and NR SL ONLY resources.
Figure 11:
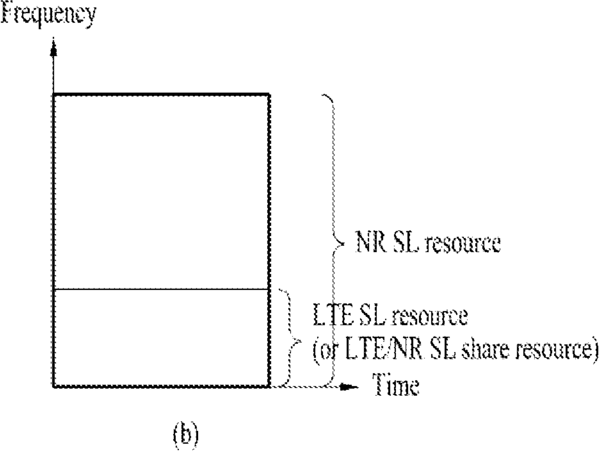
Figure 11:
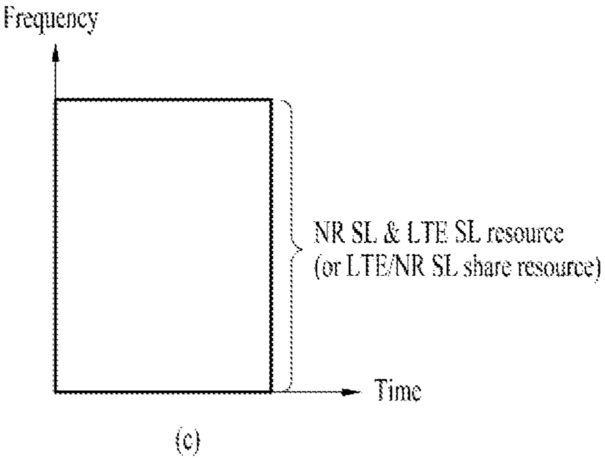

FIG. 11 is a diagram for explaining LTE/NR SL shared resources and NR SL ONLY resources.

Referring to FIG. 11(*a*), LTE SL ONLY resources and NR SL ONLY resources may be independently configured, and LTE/NR SL shared resources, which are shared by LTE SL and NR SL, may be separately configured. This corresponds to CASE A below.

CASE A: CASE A represents a scenario where LTE SL ONLY resources and NR SL ONLY resources are configured independently, and there are shared resources between LTE SL and NR SL. For example, if there are 30 MHz frequency resources available, the bottom 10 MHz may be used as LTE SL ONLY resources, the top 10 MHz may be used as NR SL ONLY resources, and the middle 10 MHz may be used as LTE/NR SL shared resources.

Referring to FIG. 11 (*b*), LTE SL resources may be set as a subset within NR SL resources. In this case, the LTE SL resources may correspond to the above-described LTE/NR SL shared resources. This corresponds to CASE B below.

CASE B: CASE B represents a scenario where NR SL resources exist and LTE SL resources exist in the form of a subset of the NR SL resources (in the time and/or frequency domain) (and/or a scenario where LTE SL resources exist and NR SL resources exist in the form of a subset of the LTE SL resources (in the time and/or frequency domain)). In other words, LTE SL resources may be configured and/or exist as a subset of NR SL resources, or NR SL resources may be configured and/or exist as a subset of LTE SL resources. For example, if 30 MHz frequency resources are present (or configured) for NR SL, the bottom 10 MHz resources among the 30 MHz frequency resources for NR SL may be used as resources for LTE SL (i.e., in the form of a subset).

Referring to FIG. 11(*c*), LTE SL and NR SL may coexist on the same resources. For example, LTE SL and NR SL resources may not be configured independently, and transmission and reception for LTE SL and NR SL may be performed within one resource pool.

CASE C: CASE C represents a scenario where LTE SL and NR SL coexist on the same resources. For example, LTE SL and NR SL may coexist on a single resource (e.g., resource pool).

Hereinafter, when "LTE/NR SL shared resources (and/or LTE SL ONLY resources)" and "NR SL ONLY resources" exist (e.g., for CASE A or CASE B described above), the conditions under which the two technologies are allowed for LTE/NR SL communication on the transmission resources and/or the detailed UE operations when the two technologies are allowed for transmission/reception on LTE/NR SL shared resources will be described.

In addition, NR SL may be defined to include SL channels/signaling/information related to NR, while LTE SL may be defined to include SL channels/signaling/information related to LTE.

Hereinafter, conditions related to NR SL transmission/reception on LTE/NR SL shared resources will be described in detail. In this case, for NR UEs, at least one of the following: ALT #1 to ALT #12 may be applied in relation to NR SL transmission/reception on LTE/NR SL shared resources.

(1) ALT #1

NR SL channels/signals/information allowed to be transmitted on LTE/NR SL shared resources may be preconfigured, or NR SL channels/signals/information allowed to be transmitted and received only on NR SL ONLY resources may be preconfigured (ALT #1).

Specifically, when preconfigured conditions (see COEX_CON in ALT #9) are met, only preconfigured NR SL channels/signals may be configured to be transmitted (and/or received) on the LTE/NR SL shared resources (and/or LTE SL ONLY resources). In this case, the NR SL channels/signals may include a NR PSSCH (NR PSCCH, NR S-SSB, and/or NR PSFCH). Alternatively, the NR SL channels/signals may be related to the NR PSSCH (NR PSCCH, NR S-SSB, and/or NR PSFCH). NR SL packet/message transmission (S-SSB transmission and/or PSFCH transmission) performed on the LTE/NR SL shared resources (and/or LTE SL ONLY resources) may be configured to be carried out in the LTE SL format (or NR SL format). In this case, the PSFCH transmission on the LTE/NR SL shared resources may be allowed only when it is possible to secure PSFCH transmission resources (as well as NR PSCCH transmission resources and/or PSSCH transmission resources). Specifically, for NR SL, if PSCCH/PSSCH transmission resources are empty (or not occupied by other UEs), related PSFCH resources are also empty (or not occupied by the other UEs). However, since it is difficult for the LTE UE to expect the operation of the NR UE, the above operation may be interpreted to protect the LTE UE operating on the corresponding resources. In other words, for NR SL, PSCCH/PSSCH resources and PSFCH resources may be associated with each other, which may allow the PSFCH resources to be occupied when the PSCCH/PSSCH resources are occupied. However, considering that such association does not exist in LTE SL, if the NR UE reserves/occupies the PSCCH/PSSCH resources within the LTE/NR SL shared resources, the PSFCH resources associated with the PSCCH/PSSCH resources may be configured to be reserved/occupied for the LTE UE.

For example, among the NR SL channels/signals (e.g., NR PSSCH, NR PSCCH, NR S-SSB, NR PSFCH, etc.), the NR PSSCH may be preconfigured as a NR SL channel/signal allowed to be transmitted and received on the LTE/NR SL shared resources. The format type of the NR SL channel/signal performed on the LTE/NR SL shared resources may also be preconfigured as either the NR SL format type or LTE SL format type. On the other hand, when the NR PSSCH and NR PSFCH are allowed to be transmitted on the LTE/NR SL shared resources, the NR UE needs to secure or reserve the resources for the PSFCH within the LTE/NR SL shared resources.

Alternatively, some (or all) of the NR SL channels/signals may be configured to be transmitted (and/or received) only on the NR SL ONLY resources. For example, the NR PSFCH (NR S-SSB, NR PSCCH, and/or NR PSSCH) may be configured as a NR SL channel/signal allowed to be transmitted on the NR SL ONLY resources. In other words, some NR SL channels/signals among the NR SL channels/signals may be preconfigured to be transmitted and received on the NR SL ONLY resources. In this case, except for the preconfigured NR SL channels/signals, the remaining NR SL channels/signals may be allowed to be transmitted and received on the LTE/NR SL shared resources. For example, the NR PSFCH may be configured to be transmitted (and/or received) only on the NR SL ONLY resources, and other NR SL channels/signals (e.g., NR S-SSB, NR PSCCH, and/or NR PSSCH) may be allowed to be transmitted and received on the LTE/NR SL shared resources.

Alternatively, transmission and/or reception (including measurement/derivation) of preconfigured NR SL information may be configured to be allowed only on the NR SL ONLY resources. For example, NR SL channel state information (CSI) (and/or NR SL reference signal received power (RSRP)) may be preconfigured as the NR SL information allowed to be transmitted/received only on the NR SL ONLY resources. Alternatively, the UE may be configured to independently perform the NR SL CSI and/or NR SL RSRP measurement/derivation (and/or NR SL CSI-RS transmission/reception) for the LTE/NR SL shared resources (and/or LTE SL ONLY resources) and NR SL ONLY resources.

(2) ALT #2

NR SL channels/signals allowed to be transmitted on LTE/NR SL shared resources may be preconfigured based on NR SL requirements (latency, reliability, etc.), priorities, NR SL retransmission, congestion levels in NR only resources, triggering of reselection of a booking/reservation process on NR only resources (ALT #2).

Specifically, when preconfigured conditions (e.g., COEX_CON) are met, only NR SL transmission (and/or reception) that satisfy at least one of the following conditions may be configured to be allowed on the LTE/NR SL shared resources (and/or LTE SL ONLY resources).

First condition: A service-related packet with a latency requirement higher (or lower) than a predetermined threshold, a service-related packet with a reliability requirement lower (or higher) than a predetermined threshold, and/or a service-related packet with a priority lower (or higher) than a predetermined threshold For example, the first condition may include at least one of the following: ① when a service-related packet has a latency requirement higher than a predetermined threshold, ② when a service-related packets has a latency requirement lower than a predetermined threshold, ③ when a service-related packets has a reliability requirement lower than a predetermined threshold, ④ when a service-related packets has a reliability requirement higher than a predetermined threshold, ⑤ when a service-related packets has a priority lower than a predetermined threshold, or ⑥ when a service-related packets has a priority higher than a predetermined threshold.

This is because there may be degradation in latency and/or reliability performance when messages are transmitted/received on the LTE/NR SL shared resources. Therefore, it may be advantageous for the UE to avoid using the resources for messages where the QoS requirements are critical.

Second condition: NR (TB-related) retransmission (and/or initial transmission)

For example, both NR TB-related initial transmission and NR TB-related retransmission may be performed either on the NR SL ONLY resources or LTE/NR SL shared resources. Alternatively, the initial transmission (or retransmission) may be performed on the NR SL ONLY resources, while the retransmission (or initial transmission) may be performed on the LTE/NR SL shared resources. For example, while the NR UE may perform the TB-related initial transmission on the NR SL ONLY resources, the NR UE may be allowed to perform the TB-related retransmission on the LTE/NR SL shared resources.

Third condition: When the congestion level (e.g. CBR) and/or interference level related to the NR SL ONLY resources exceed a predetermined threshold, transmission/reception of NR SL information may be allowed on the LTE/NR SL shared resources (and/or LTE SL ONLY resources). For example, when the CBR and/or interference level measured for the NR SL ONLY resources are above the predetermined threshold, the NR UE may transmit/receive the NR SL information on the LTE/NR SL shared resources (and/or LTE SL ONLY resources).

For example, the third condition may include at least one of the following: ① when the congestion level (e.g., CBR, channel occupancy ratio (CR), etc.) related to the NR SL ONLY resources exceed a predetermined threshold or ② when the interference level related to the NR SL ONLY resources exceed a predetermined threshold.

Fourth condition: When the SL communication-related (supportable) quality (e.g., SL CSI, the number of occurrences of (consecutive) NACK (and/or discontinuous transmission (DTX)), the frequency of occurrences of (consecutive) SL radio link failure (RLF)) on the NR SL ONLY resources is less than or equal to a predetermined threshold quality level, transmission (and/or reception) of NR SL signals/channels/information may be allowed on the LTE/NR SL shared resources (and/or LTE SL ONLY resources). In other words, when the number of occurrences of SL communication-related NACK or SL RLF on the NR SL ONLY resources is more than or equal to a predetermined threshold or when CSI measured for the NR SL ONLY resources is less than a predetermined threshold, the NR UE may be allowed to transmit/receive the NR SL signals/channels/information on the LTE/NR SL shared resources (and/or LTE SL ONLY resources).

For example, the fourth condition may include at least one of the following: ① when SL communication-related (supportable) SL CSI on the NR SL ONLY resources has a quality less than or equal to a predetermined threshold quality, ② when the number of occurrences of (consecutive) NACK is more than or equal to a predetermined threshold number, ③ when the number of occurrences of (consecutive) DTX is more than or equal to a predetermined threshold number, or ④ when the number of occurrences of (consecutive) SL RLF is more than or equal to a predetermined threshold number.

Specifically, when the value of the SL CSI (e.g., channel quality indicator (CQI), rank indicator (RI), etc.) measured for the NR SL ONLY resources is lower than a predetermined threshold level, transmission (and/or reception) of NR SL information may be allowed on the LTE/NR SL shared resources (and/or LTE SL ONLY resources). Additionally/alternatively, when the number of occurrences of (consecutive) NACK (and/or DTX) (related to a specific TB) and/or the frequency of occurrences of (consecutive) SL RLF (related to a specific SL session) exceeds a predetermined threshold number, transmission (and/or reception) of the NR SL information may be allowed on the LTE/NR SL shared resources (and/or LTE SL ONLY resources).

For example, when the CSI measured for the NR SL ONLY resources is below (or less than) a predetermined threshold, or when the number of occurrences of NACK, DTX, and/or SL RLF on the NR SL ONLY resources is above (or more than) a predetermined number, the NR UE may be allowed to transmit/receive the NR SL signals/channels/information on the LTE/NR SL shared resources (and/or LTE SL ONLY resources).

Fifth condition: The fifth condition may correspond to a case in which the reselection of (all, at least one, or a predetermined ratio/number of) booking/reservation processes related to NR SL transmission (and/or reception) on the NR SL ONLY resources is triggered. If the reselection of at least one or a predetermined ratio/number of reserved resources (or the reselection of booking/reservation processes) is performed in NR SL transmission, the NR UE may be configured to allow switching to the LTE/NR SL shared resources (and/or LTE SL ONLY resources). When the reselection of some (or the predetermined ratio/number) of the booking/reservation processes related to NR SL transmission (and/or reception), which is currently performed on the NR SL ONLY resource, is triggered, the remaining booking/reservation processes related to NR SL transmission and/or reception, except for the reselected booking/reservation processes, may be configured to be terminated (including an operation of flushing a buffer related to an associated SL HARQ process). Additionally/alternatively, the NR SL transmission (and/or reception) operations related to the remaining booking/reservation processes may also be configured to switch to the LTE/NR SL shared resources (and/or LTE SL ONLY resources). In this case, terminating the NR SL transmission related to the remaining booking/reservation processes and/or switching the NR SL transmission related to the remaining booking/reservation processes to the LTE/NR SL shared resources (and/or LTE SL ONLY resources) may be limited when the UE has limited (TX and/or RX) chain capability. Alternatively, the NR SL transmission (and/or reception) related to the remaining booking/reservation processes may be maintained on the NR SL ONLY resources, but the NR SL transmission (and/or reception) related to the booking/reservation processes of which the reselection is triggered may be configured to be performed on the LTE/NR SL shared resources (and/or LTE SL ONLY resources).

For example, for a NR SL booking/reservation process in which the reselection of more than a predetermined ratio/number of reserved resources is triggered among one or more NR SL booking/reservation processes that are currently performed on the NR SL ONLY resources, NR SL transmission/reception may be allowed on the LTE/NR SL shared resources (and/or LTE SL ONLY resources). Except for the NR SL booking/reservation processes in which the reselection of reserved resources is triggered, the remaining NR SL booking/reservation processes may be terminated (for example, the operation of flushing the buffer related to the associated SL HARQ process may be included). Additionally/alternatively, the NR SL transmission/reception may be allowed on the LTE/NR SL shared resources (and/or LTE SL ONLY resources).

(3) ALT #3

Hereafter, conditions for switching back to NR SL ONLY resources after NR SL transmission/reception (e.g., NR SL signals/channels/information) is allowed on LTE/NR SL shared resources (and/or LTE SL ONLY resources) will be described (ALT #3).

Specifically, NR SL transmission and/or reception performed on the LTE/NR SL shared resources (and/or LTE SL ONLY resources) may be configured to be performed for each TB (or for every predetermined number of TBs) (and/or for each NR SL HARQ process ID, for each booking/reservation process, etc.). Additionally/alternatively, switching between the NR SL ONLY resources and the LTE/NR SL shared resources (and/or LTE SL ONLY resources) may also be configured to be performed for each TB (or for every predetermined number of TBs) (and/or for each NR SL HARQ process ID, for each booking/reservation process, etc.). This may be interpreted to mean that when TB-related transmission (and/or reception) is performed on specific types of resources, the corresponding resources may be used limitedly until the transmission (and/or reception) is completed/successful.

For example, if the NR UE completes the NR SL transmission/reception for a single TB or a predetermined number of TBs on the LTE/NR SL shared resources, resources for performing the NR SL transmission/reception may switch from the LTE/NR SL shared resources to the NR SL ONLY resources.

Alternatively, when reselection of (all, at least one, or a predetermined ratio/number of) booking/reservation processes related to NR SL transmission/reception performed (or being currently performed) on the LTE/NR SL shared resources (and/or LTE SL ONLY resources) is triggered, switching to the NR SL ONLY resources may be allowed. In this case, when the reselection of (all, at least one, or a predetermined ratio/number of) the booking/reservation processes related to NR SL transmission (and/or reception) currently performed on the LTE/NR SL shared resources (and/or LTE SL ONLY resources) is triggered, the remaining booking/reservation process related NR SL transmission (and/or receptions) (which are currently used), except for the booking/reservation processes, may be terminated (for example, an operation of flushing a buffer related to an associated SL HARQ process may be included). Alternatively, the NR SL transmission (and/or reception) operations related to the remaining booking/reservation processes may also switch to the NR SL ONLY resources. In this case, the terminating and/or switching may be limited when the UE has limited (TX and/or RX) chain capability. Alternatively, the NR SL transmission (and/or reception) related to the remaining booking/reservation processes may be maintained on the LTE/NR SL shared resources (and/or LTE SL ONLY resources), but the NR SL transmission (and/or reception) related to the booking/reservation processes of which the reselection is triggered may be configured to be performed on the NR SL ONLY resources.

If the reselection of booking/reservation processes is triggered for some (or a predetermined ratio/number) of the transmission and reception resources related with NR SL transmission (and/or reception) on the LTE/NR SL shared resources, the NR UE may be allowed to switch to the NR SL ONLY resources.

(4) ALT #4

When NR SL ONLY resources and LTE/NR SL shared resources coexist as in CASE #A (and/or CASE #B) described above, NR SL transmission (and/or reception) operations may be configured to be performed as follows. Alternatively, when the NR SL transmission/reception on the LTE/NR SL shared resources is allowed, the following operations may be performed.

For example, when NR SL transmission is performed using the NR SL ONLY resources and LTE/NR SL shared resources at the same time, the UE may configure scheduling information for SCI on the NR SL ONLY resources based on parameters related to the corresponding resources (e.g., the number/size of sub-channels, the number of slots capable of being signaled by one piece of SCI, etc.) for the NR SL ONLY resources. For the LTE/NR SL shared resources, the UE may configure scheduling information for SCI on the LTE/NR SL shared resources based on parameters related to the LTE/NR SL shared resources (and/or NR SL ONLY resources). In this case, the resource-related parameters may include the number/size of sub-channels, the number of slots capable of being signaled by one piece of SCI, etc.

Specifically, legacy NR UEs (e.g., UEs that are not optimized for LTE/NR coexistence operation within the same band) and advanced NR UEs (e.g., UEs that support the LTE/NR coexistence operation) may coexist on the NR SL ONLY resources. In this case, when the advanced NR UE performs the proposed operation on the NR SL ONLY resources, the advanced NR UE may perform transmission/reception based on a legacy NR SL signal format/structure (decodable by the legacy NR UE) in order to protect the operation/performance of the legacy NR UE that transmits/receives on the NR SL ONLY resources.

The advanced NR UE (and/or legacy NR UE) may be configured to use parameters and/or SCI formats (and/or scheduling configuration information for SCI) on the LTE/NR SL shared resources that differ from those used on the NR SL ONLY resources (for example, the parameters include the number/size of sub-channel numbers/sizes, the number of slots capable of being signaled by one piece of SCI, etc.). The parameters, SCI format, and/or scheduling configuration information for SCI may be configured to use parameters/formats that are decodable only by the advanced NR UE (while being undecodable by the legacy NR and/or LTE UE). Furthermore, when advanced NR UEs perform transmission/reception using different (or the same) parameters (e.g., the number/size of sub-channel numbers/sizes, the number of slots capable of being signaled by one piece of SCI, etc.), different SCI formats, and/or different scheduling configuration information for SCI, the advanced NR UEs may have the ability (capability) for simultaneous transmission on the LTE/NR SL shared resources (and/or LTE SL ONLY resources) and the NR SL ONLY resources.

In this case, the advanced NR UE may perform frequency division multiplexing/time division multiplexing (FDM/TDM) transmission on the LTE/NR SL shared resources (and/or LTE SL ONLY resources) and the NR SL ONLY resources. For example, if the advanced NR UE has the capability to simultaneously transmit on the LTE/NR SL shared resources (and/or LTE SL ONLY resources) and the NR SL ONLY resources, the advanced NR UE may perform NR SL transmission and reception on both the LTE/NR SL shared resources (and/or LTE SL ONLY resources) and the NR SL ONLY resources based on FDM/TDM.

(5) Alt #5

In the case of a guard band (GB) related to LTE SL resources (i.e., LTE-GB) (for example, especially when an LTE-GB is included within NR SL resources), if COEX_CON is satisfied, the UE (or NR UE) may be configured to use the corresponding GB for NR SL transmission (and/or reception) (ALT #5). On the other hand, in determining whether COEX_CON is satisfied within the LTE-GB, the "thresholds" for each parameter in COEX_CON rules #1 to #7 (e.g., sidelink received signal strength indicator (S-RSSI), PSSCH/PSCCH DMRS RSRP, CBR, etc.) may be independently (differently or identically) configured, regardless of whether NR SL communication is performed on the NR ONLY resources or the LTE ONLY resources. COEX_CON rules #1 to #7 will be described in detail in ALT #9.

For example, when determining whether COEX_CON is satisfied in the LTE-GB, the threshold values for each parameter in COEX_CON rules #1 to #7 (e.g., S-RSSI, PSSCH/PSCCH DMRS RSRP, CBR, etc.) may be configured to be different from those when NR SL communication is performed on NR ONLY resources and/or LTE ONLY resources. Alternatively, when determining whether COEX_CON is satisfied in the LTE-GB, the threshold values for each parameter in COEX_CON rules #1 to #7 (e.g., S-RSSI, PSSCH/PSCCH DMRS RSRP, CBR, etc.) may be configured to be the same as those when NR SL communication is performed on NR ONLY resources and/or LTE ONLY resources.

(6) ALT #6

When NR SL transmission/reception is allowed on LTE/NR SL shared resources (and/or LTE SL ONLY resources), the numerology (SCS, CP length, etc.), automatic gain control (AGC), port number, transmission scheme, and resource reservation method for the NR SL transmission/reception may be configured and/or defined as follows (ALT #6).

For instance, the NR UE may perform the NR SL transmission/reception on the LTE/NR SL shared resources (and/or LTE SL ONLY resources) based on the numerology, AGC, port number, transmission scheme, and/or resource reservation method configured for LTE. Alternatively, the NR UE may perform the NR SL transmission/reception on the LTE/NR SL shared resources (and/or LTE SL ONLY resources) based on the numerology, AGC, port number, transmission scheme, and/or resource reservation method configured for NR.

Specifically, when the NR SL transmission/reception is performed on the LTE/NR SL shared resources (and/or LTE SL ONLY resources), the NR SL transmission/reception may be performed based on the LTE numerology (or NR numerology). For example, the NR SL transmission may be configured to performed based on the LTE numerology (and/or LTE physical structure) or the NR numerology (i.e., NR numerology used on the NR ONLY resources and/or LTE physical structure), for example, SCS, CP length, units (and/or parameters). For instance, if the SCS for NR SL is 30 kHz, it may be interpreted to mean that two related transmissions/receptions are performed as one bundle in a one-millisecond (msec) LTE subframe (SF). Alternatively, if the SCS for NR SL is 30 kHz, it may be interpreted to mean that two related transmissions/receptions are considered as one bundle, and the UE performs AGC using only AGC symbols included in the first slot within a one-msec LTE SF. Additionally or alternatively, the NR SL transmission/reception performed on the LTE/NR SL shared resources (and/or LTE SL ONLY resources) may be limited by a predetermined antenna port (AP) number (e.g., 1) and/or a transmission scheme (e.g., no TX diversity, space frequency block coding (SFBC), etc.). Additionally or alternatively, the NR transmission (and/or reception) performed on the LTE/NR SL shared resources (and/or LTE SL ONLY resources) may be limited by a periodic (and/or non-periodic) resource reservation method.

(7) ALT #7

Hereinafter, a method by which the UE measures a CBR/CR on LTE/NR SL shared resources (and/or LTE SL ONLY resources) and NR SL ONLY resources will be described (ALT #7).

For example, the UE may be configured to measure/derive the CBR and/or CR independently (or in combination) for the LTE/NR SL shared resources (and/or LTE SL ONLY resources) and the NR SL ONLY resources. When the corresponding rule is applied, it may be interpreted that congestion control operations are independently performed/applied to different types of resources. For example, the UE may be configured to measure/derive the CBR (and/or CR) in a merged/integrated manner for the LTE/NR SL shared resources (and/or LTE SL ONLY resources) and the NR SL ONLY resources.

(8) ALT #8

Hereinafter, the operation of the UE when the UE detects an LTE SL channel/signal that does not meet the conditions of ALT #9 while performing transmission (and/or sensing) of NR SL channels/signals on LTE/NR SL shared resources (and/or LTE SL ONLY resources) will be described (ALT #8).

Specifically, when the UE performs transmission/reception or sensing of the NR SL channels/signals on the LTE/NR SL shared resources (and/or LTE SL ONLY resources) and detects transmission of an LTE SL channel/signal (that meets the conditions of ALT #9), the UE may be configured to follow at least one of the following rules.

① The UE reselects (and/or transmits) only NR SL channel/signal transmission resources that overlap with the LTE SL channel/signal transmission (and/or an SL GRANT related to NR SL channel/signal transmission) on the LTE/NR SL shared resources (and/or LTE SL ONLY resources) (or on the NR SL ONLY resources).

② The UE (re)selects resources for transmitting the NR SL channels/signals on the NR SL ONLY resources (after switching from the LTE/NR SL shared resources (and/or LTE SL ONLY resources) to the NR SL ONLY resources).

③ The UE excludes a time resource region (e.g., SF) (and/or a time and frequency resource region) where the LTE SL channel/signal transmission exists from candidate resources available for NR SL channel/signal transmission.

For example, if the NR UE detects an LTE SL channel/signal that does not satisfy the conditions of ALT #9, the UE may perform the following operations: reselecting only NR SL channel/signal transmission resources that overlap with the LTE SL channel/signal transmission on the LTE/NR SL shared resources: switching to the NR SL ONLY resources and then reselecting transmission resources; and/or excluding a time resource region that overlaps with the LTE SL channel/signal transmission from LTE/NR SL shared resources for NR SL channel/signal transmission.

(9) ALT #9

When an NR SL channel/signal to be transmitted/received on LTE/NR SL shared resources satisfies the above-described conditions, if the NR SL channel/signal additionally meets COEX_CON (at least one of rules #1 to #7), the NR SL channel/signal may be limitedly allowed to be transmitted/received on the LTE/NR SL shared resources.

Specifically, the NR SL channel/signal transmission (and/or reception) on the LTE/NR SL shared resources (and/or LTE SL ONLY resources) may be limitedly allowed only when (some or all of) COEX_CON is (additionally) satisfied. In this case, if COEX_CON is not satisfied, it may be interpreted that the NR SL channel/signal transmission (and/or reception) is performed using only the NR SL ONLY resources (or by falling back to the NR SL ONLY resources). For example, when the NR SL channel/signal transmission satisfies the above-mentioned conditions (ALT #1, ALT #2, etc.), if the NR SL channel/signal transmission does not satisfy COEX_CON (at least one of rules #1 to #7), the NR SL transmission/reception may be performed on the NR SL ONLY resources rather than the LTE/NR SL shared resources.

COEX_CON, which is the criteria for allowing NR SL channel/signal transmission (and/or reception) operations on the LTE/NR SL shared resources (and/or LTE SL ONLY resources), may include at least one of rule #1 to rule #7.

- Rule #1: When the S-RSSI measurement value (within a predefined time window and/or a predetermined number of slots) is lower than a predetermined threshold
- Rule #2: When LTE SL channel/signal transmission with a PSSCH DMRS RSRP measurement value (based on PSCCH decoding) higher than a predetermined threshold (and/or NR SL channel/signal transmission with a PSSCH (and/or PSCCH) DMRS RSRP measurement value higher than a predetermined threshold) is not detected (within a predefined time window and/or a predetermined number of slots)
- Rule #3: When an LTE SL channel/signal (and/or NR SL channel/signal) of a higher priority than a predetermined threshold is not detected (within a predefined time window and/or a predetermined number of slots)
- Rule #4: When a CBR value measured within a resource pool (within a predefined time window and/or a predetermined number of slots) is lower than a predetermined threshold
- Rule #5: When a NR PSCCH/PSSCH is transmitted for a TB where SL HARQ feedback is requested, if at least one of rules #1 to #4 (e.g. rule #2 and rule #3) is satisfied on associated NR PSFCH resources (and/or resources from the NR PSCCH/PSSCH transmission to the associated NR PSFCH) (for example, the UE may be configured to (additionally) transmit predetermined information (e.g., dummy information, information on an associated TB which is previously transmitted, etc.) on NR PSCCH/PSSCH resources within a slot where NR PSFCH resources exist)
- Rule #6: When the congestion level (e.g., CBR) and/or interference level related to NR SL ONLY resources exceeds a predetermined threshold
- Rule #7: When the SL communication-related (supportable) quality (e.g., SL CSI, the number of occurrences of (consecutive) NACK (and/or DTX), the frequency of occurrences of (consecutive) SL RLF) on the NR SL ONLY resources does not satisfy a predetermined threshold level Alternatively, instead of applying the aforementioned rules to the LTE/NR SL shared resources (and/or LTE SL ONLY resources), LTE SL-based sensing operations may be performed to select/reserve NR SL channel/signal transmission resources, and handling of an overlap with LTE SL channel/signal transmission resources may be configured as (NR) pre-emption (and/or re-evaluation) operations. In this case, an SL RSRP threshold (and/or priority threshold) used for the (NR) pre-emption (and/or re-evaluation) may be configured independently of (i.e., differently from or equally to) when NR SL communication is performed on the NR SL ONLY resources.

(10) ALT #10

When the UE is capable of using both NR SL ONLY resources and LTE/NR SL shared resources, the UE may be configured to report sensing result information and/or congestion information on at least one of the NR SL ONLY resources and the LTE/NR SL shared resources (ALT #10).

Specifically, (NR MODE 1) the UE may be configured to report sensing result information (and/or (resource pool) CBR measurement information) on (LTE SL channels/signals on) the LTE/NR SL shared resources (and/or LTE SL ONLY resources) to the BS over a predetermined channel/signal (e.g., PUSCH, PUCCH, MAC CE, etc.). For example, if the UE is capable of measuring/deriving a CBR and/or CR independently (or in combination) for the LTE/NR SL shared resources (and/or LTE SL ONLY resources) and the NR SL ONLY resources (as in ALT #7), the UE may be configured to report information on multiple CBR measurements (per resource pool) (which are measured/derived from the LTE/NR SL shared resources, the LTE SL ONLY resources, and/or the NR SL ONLY resources) to the BS over the predetermined channel/signal (e.g., PUSCH, PUCCH, MAC CE, etc.). Alternatively, the UE may be configured to report integrated/merged CBR values (which are measured/derived from the LTE/NR SL shared resources, the LTE SL ONLY resources, and/or the NR SL ONLY resources. For example, the UE may independently report sensing result information and/or congestion information respectively measured for the NR SL ONLY resources and LTE/NR SL shared resources. Alternatively, the UE may report sensing result information and/or congestion information measured for both the NR SL ONLY resources and LTE/NR SL shared resources.

(11) ALT #11

When the UE has no capability to simultaneously perform NR SL and LTE SL transmission/reception operations, a time region in which transmission/reception on LTE/NR SL shared resources is prioritized over transmission/reception on NR SL ONLY resources may be configured (ALT #11).

Specifically, if the UE has no capability to perform simultaneous transmission/reception (e.g., simultaneous transmission and/or simultaneous reception) for NR SL and LTE SL (on different frequency resources), a time region in which reception (and/or transmission) on the LTE/NR SL shared resources (and/or LTE SL ONLY resources) is prioritized over NR SL channel/signal transmission (and/or reception) on the NR SL ONLY resources may be configured. When the time region is configured, it may ensure sensing operations above a certain level while reducing interference to LTE SL channel/signal communication on the LTE/NR SL shared resources (and/or LTE SL ONLY resources) (for example, the sensing operations above the certain level are to reduce the interference to the LTE SL channel/signal communication on the LTE/NR SL shared resources (and/or LTE SL ONLY resources)).

(12) ALT #12

The UE may be configured to perform NR SL transmission/reception on LTE/NR SL shared resources based on a synchronization reference/source related to LTE (ALT #12).

Specifically, the UE may be synchronized to the same (or different) synchronization reference/source on the LTE/NR SL shared resources (and/or LTE SL ONLY resources) and NR SL ONLY resources to perform NR SL channel/signal transmission (and/or reception). For example, the UE may be synchronized to an LTE synchronization reference/source on the LTE/NR SL shared resources (and/or LTE SL ONLY resources) for the NR SL channel/signal transmission (and/or reception). On the other hand, the UE may be synchronized to a NR synchronization reference/source, which is different from the LTE synchronization reference/source, on the NR SL ONLY resources for the NR SL channel/signal transmission (and/or reception).

Alternatively, in the above example, if the LTE synchronization reference/source and the NR synchronization reference/source are set to be the same, it may be interpreted to mean that the UE may operate under the same timing reference when performing the NR SL channel/signal transmission/reception on the LTE/NR SL shared resources (and/or LTE SL ONLY resources) and the NR SL ONLY resources. In this case, the UE may perform the NR SL channel/signal transmission/reception on the LTE/NR SL shared resources (and/or LTE SL ONLY resources) and the NR SL ONLY resources under the same timing reference only if a GNSS has the highest synchronization reference priority. In this proposal, the synchronization reference/source for LTE or NR may include a GNSS, a BS (e.g., eNB, gNB, etc.), and/or other independent UEs (e.g., UEs synchronized directly to the GNSS, UEs synchronized in time/frequency to the BS (within or outside network coverage, etc.)).

(13) ALT #13

Alternatively, when the UE performs NR SL channel/signal transmission/reception on LTE/NR SL shared resources, the UE may be configured to maintain the NR SL channel/signal transmission/reception on the LTE/NR SL shared resources for a predetermined time period or longer (ALT #13).

Specifically, when the UE performs the NR SL channel/signal transmission/reception on the LTE/NR SL shared resources (and/or LTE SL ONLY resources), the UE may be required to maintain the occupation of allocated resources for the predetermined (minimum, maximum, or average) time period or longer. This may be to improve the sensing accuracy of LTE UEs performing transmission/reception on the corresponding resources.

Alternatively, when the UE performs the NR SL channel/signal transmission/reception on the LTE/NR SL shared resources (and/or LTE SL ONLY resources), the UE may perform LTE-based sensing operations or part of LTE SL sensing operations on the LTE/NR SL shared resources (and/or LTE SL ONLY resources), which is different from sensing operations on NR ONLY resources. For example, the UE may perform PSSCH DMRS RSRP measurement (scheduled by a successfully decoded PSCCH) and/or S-RSSI measurement (based on a V2X resource pool-related sub-channel), which correspond to the LTE-based sensing operations. Alternatively, the UE may perform S-RSSI measurement (based on a V2X resource pool-related sub-channel) and/or PSSCH DMRS RSRP measurement (scheduled by a successfully decoded PSCCH), which correspond to the part of the LTE SL sensing operations. Considering that NR SL sensing operations and LTE SL sensing operations are different, when the (advanced or legacy) NR UE performs the NR SL channel/signal transmission/reception on the LTE/NR SL shared resources, the NR UE may be configured to perform the LTE sensing operations (for coexistence with the LTE UE performing LTE SL channel/signal transmission/reception on the corresponding resources). Additionally, in this case, the (advanced and/or legacy) NR UE may perform the entire LTE sensing operation, but the NR UE may be allowed to perform only parts of the LTE sensing operations, thereby reducing UE implementation/computational complexity.

(14) ALT #14

When the UE has no capability to simultaneously perform NR SL and LTE SL transmission/reception operations, the starting point of sensing operations for performing NR SL channel/signal transmission/reception on LTE/NR SL shared resources may be preconfigured (ALT #14).

Specifically, when the UE has no capability to perform simultaneous transmission/reception (e.g., simultaneous transmission and/or simultaneous reception) for NR SL and LTE SL (on different frequency resources), if the UE performs the NR SL channel/signal transmission/reception on the LTE/NR SL shared resources (and/or LTE SL ONLY resources) and/or NR SL ONLY resources, the sensing operations for the NR SL channel/signal transmission may be configured to start upon the arrival of a related TB (e.g., TB for NR SL to be transmitted on the LTE/NR SL shared resources). For example, when the UE has no capability to perform simultaneous transmission/reception for NR SL and LTE SL, the UE may be configured to continuously perform the sensing operations on the LTE/NR SL shared resources (and/or LTE SL ONLY resources) to perform the NR SL channel/signal transmission/reception on the corresponding resources. In this case, the UE may lose the opportunity for transmission on the NR SL ONLY resources while performing the above-described operation. Therefore, in this case, the UE may primarily perform the sensing operations on the NR SL ONLY resources. However, the UE may perform the sensing operations on the LTE/NR SL shared resources (and/or LTE SL ONLY resources) only when there is a TB to be transmitted on the LTE/NR SL shared resources (and/or LTE SL ONLY resources) (additionally/alternatively, the UE may initiate the sensing operations upon the arrival of the TB to be transmitted on the corresponding resources arrives) (which is to mitigate half-duplex issues from the perspective of in-device coexistence). As a specific example, the above operation may imply that the starting point of a sensing window defined in mode-2 resource allocation needs to be set to the time of the TB arrival (or thereafter). Alternatively, the operation may also be interpreted that sensing operations defined in mode-2 resource allocation start after a predefined minimum processing time after the TB arrival.

For example, the applicability of the above-described rules (proposed methods, rule-related parameters, and/or thresholds proposed in the present disclosure) may be specifically (differently or independently) configured/allowed for at least one of the following elements/parameters: service types, (logical channel (LCH) or service) priorities, QoS requirements, PQI parameters, HARQ feedback enabled (and/or disabled) LCH/MAC PDU transmission, CBR measurement values of a resource pool, SL cast types, SL groupcast HARQ feedback options, SL mode 1 CG types, SL mode types, resource pools, the presence of a resource pool where PSFCH resources are configured, source (L2) IDs (and/or destination (L2) IDs, PC5 RRC connection links, SL links, connection states, SL HARQ processes (IDs), whether SL discontinuous (DRX) operation is performed by (a TX UE or RX UE), the presence of a power-saving (TX or RX) UE, when PSFCH TX and PSFCH RX (and/or multiple PSFCH TX exceeding UE capability) overlap with each other (from the perspective of a specific UE), when PSFCH TX (and/or PSFCH RX) is omitted, and/or when a RX UE actually (successfully) receives (re)transmission of a PSCCH (and/or PSSCH) from a TX UE.

Herein, the term “configured” (or “specified”) may also be expansively interpreted to mean that the BS informs the UE in a predefined (physical layer or higher layer) channel/signal (e.g., SIB, RRC, MAC CE, etc.) and/or through a pre-configuration (and/or that the UE informs other UE in a predefined (physical layer or higher layer) channel/signal (e.g., SL MAC CE, PC5 RRC, etc.). In addition, the term “PSFCH” may also be expansively interpreted as a (NR or LTE) PSSCH, a (NR or LTE) PSCCH, a (NR or LTE) SL SSB, and/or a UL channel/signal. Additionally, the proposed methods may be combined and used (as a new type of method).

Figure 12:
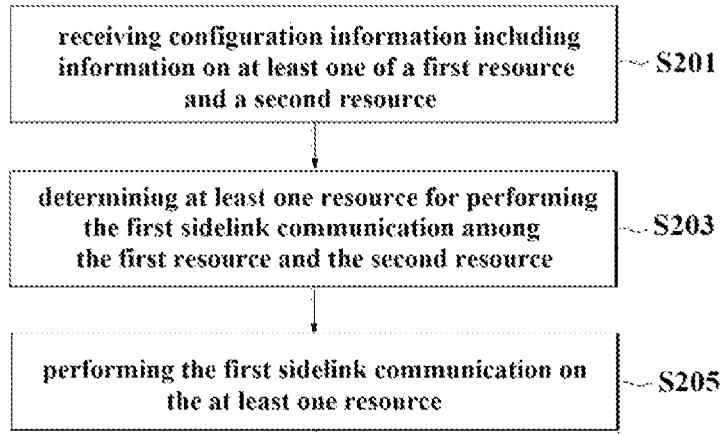
FIG. 12 is a diagram for explaining a method of performing first SL communication based on a first wireless technology.

FIG. 12 is a diagram for explaining a method of performing first SL communication based on a first wireless technology.

Referring to FIG. 12, a first UE may receive configuration information including information on at least one of a first resource and a second resource (S201). The first SL communication based on the first wireless technology is NR-based SL communication as described above, and the first resource may be a resource for the NR-based SL communication (e.g., NR SL only resource). Second SL communication based on a second wireless technology is LTE-based SL communication, and the second resource may be a resource shared between the first SL communication and the second SL communication (e.g., NR/LTE SL shared resource or LTE SL only resource). The configuration information is configuration information related to resource pools received from a BS. In other words, the configuration information may be information for configuring resource pools for NR and LTE as described above with reference to FIG. 11.

As described above, the first UE is capable of performing the first SL communication based on NR, which is the first wireless technology. The first UE may be an advanced first UE capable of using both the first resource, which is the NR SL only resource, and the second resource.

Next, the first UE may determine at least one resource to perform the first SL communication among the first resource and the second resource (S203). As described above, the at least one resource for the first SL communication is generally determined to be the first resource. However, if specific conditions are satisfied, the at least one resource for the first SL communication may be determined to be the second resource or determined to include both the first resource and the second resource.

The specific conditions may be determined based on quality information related to the first resource as described above. The quality information is measurement information related to a CBR or CR measured for the first resource or information related to the number of NACK occurrences, the number of DTX occurrences, or the number of RLF occurrences. Additionally/alternatively, the quality information may be information related to the rate or frequency at which reselection of a (resource) booking/reservation process related to the first SL communication on the first resource is triggered.

Specifically, the first UE may determine the second resource as the at least one resource based on the CBR or CR measured for the first resource being less than or equal to a predetermined threshold quality. Alternatively, the first UE may measure or count the number of NACK occurrences, the number of DTX occurrences, or the number of RLF occurrences, which are all related to the first resource. If the number of NACK occurrences, the number of DTX occurrences, or the number of RLF occurrences is more than or equal to a predetermined threshold number, the first UE may determine the second resource as the at least one resource. Alternatively, if the rate or frequency at which the reselection of the (resource) booking/reservation process related to the first SL communication on the first resource is triggered is more than or equal to a predetermined rate or frequency, the first UE may determine the second resource as the at least one resource. In other words, if the above-mentioned specific conditions are satisfied, the first UE may be configured to perform the first SL communication on the second resource.

The first UE may determine whether to perform the first SL communication on the second resource by considering not only the specific conditions but also measurement information measured or obtained from the second resource. For example, even when the specific conditions are satisfied, if the measurement information does not satisfy predetermined conditions (rules #1 to #7 in ALT #9), the first UE may not perform the first SL communication on the second resource. Alternatively, even when the specific conditions are satisfied, if the measurement information does not satisfy the predetermined conditions (rules #1 to #7 in ALT #9), the first UE may not include the second resource in the at least one resource.

The quality information may include at least one of an S-RSSI, a CBR, a CR, and an RSRP measured for the second resource. In this case, the RSRP may be measured based on a DMRS included in a PSSCH or PSCCH received on the second resource.

Then, the first UE may perform the first SL communication on the at least one resource (S205). When the second resource is included in the at least one resource, the first SL communication to be performed on the second resource may be transmitted based on the numerology or synchronization reference configured for the second SL communication based on the second wireless technology on the second resource. This is to minimize signal interference to UEs performing the second SL communication (i.e., LTE-based SL communication) on the second resource.

As described above, according to at least one of ALT #1 to ALT #14, the first UE may determine whether to perform the first SL communication on the second resource, configure the numerology and/or synchronization reference/source for performing the first SL communication on the second resource, or determine whether to switch again from the second resource to the first resource.

Herein, performing the first SL communication may mean transmission and/or reception of a PSCCH, a PSSCH, a PSFCH, an SSB, etc. based on the first wireless technology as described above.

Figure 13:
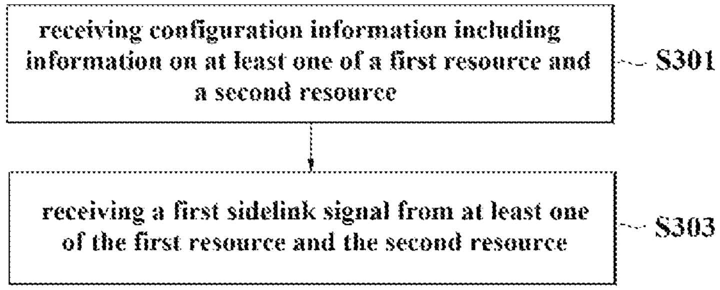
FIG. 13 is a diagram for explaining a method of receiving a first SL signal based on a first wireless technology.

FIG. 13 is a diagram for explaining a method of receiving a first SL signal based on a first wireless technology.

Referring to FIG. 13, a second UE may receive configuration information including information on at least one of a first resource and a second resource (S301). First SL communication based on the first wireless technology is NR-based SL communication as described above, and the first resource may be a resource for the NR-based SL communication (e.g., NR SL only resource). Second SL communication based on a second wireless technology is LTE-based SL communication, and the second resource may be a resource shared between the first SL communication and the second SL communication (e.g., NR/LTE SL shared resource or LTE SL only resource). The configuration information is configuration information related to resource pools received from a BS. In other words, the configuration information may be information for configuring resource pools for NR and LTE as described above with reference to FIG. 11.

The configuration information may be received in SCI or a PSCCH transmitted from a first UE described above with reference to FIG. 12. In this case, the configuration information may be scheduling information for scheduling a PSSCH or PSFCH on the at least one of the first resource and the second resource.

As described above, the second UE is capable of performing the first SL communication based on NR. The second UE may be an advanced second UE capable of using both the first resource, which is the NR SL only resource, and the second resource.

Next, the second UE may receive the first SL signal on the at least one of the first resource and the second resource. (S303). As described above, the first SL signal based on NR, which is the first wireless technology, is generally received on the first resource. However, if specific conditions are met, the first SL signal may also be received on the second resource.

The specific conditions may be determined based on quality information related to the first resource as described above. The quality information is measurement information related to a CBR or CR measured for the first resource or information related to the number of NACK occurrences, the number of DTX occurrences, or the number of RLF occurrences. Additionally/alternatively, the quality information may be information related to the rate or frequency at which reselection of a (resource) booking/reservation process related to the first SL communication on the first resource is triggered.

Specifically, the first SL signal may be received on the second resource based on the CBR or CR measured for the first resource being less than or equal to a predetermined threshold quality. Alternatively, if the number of NACK occurrences, the number of DTX occurrences, or the number of RLF occurrences, which are all related to the first resource, is more than or equal to a predetermined threshold number, the first SL signal may be received on the second resource. Alternatively, if the rate or frequency at which the reselection of the (resource) booking/reservation process related to the first SL communication on the first resource is triggered is more than or equal to a predetermined rate or frequency, the first SL signal may be received on the second resource. In other words, if the above-mentioned specific conditions are satisfied, the first SL signal may be allowed to be transmitted on the second resource, and thus the second UE may receive the first SL signal transmitted from the transmitting UE on the second resource.

Measurement information measured or obtained from the second resource as well as the specific conditions may be considered to receive the first SL signal on the second resource. For example, even when the specific conditions are satisfied, if the measurement information does not satisfy predetermined conditions (rule #1 to rule #7 in ALT #9), the transmitting UE may not transmit the first SL signal on the second resource. The first SL signal may not be received on the second resource based on that the measurement information does not satisfy the predetermined conditions.

When the first SL signal is received on the second resource, the first SL signal may be received based on the numerology or synchronization reference configured for the second SL communication based on the second wireless technology coexisting on the second resource. This is to minimize signal interference to UEs performing the LTE-based SL communication on the second resource.

According to an example of the proposed disclosure, efficient coexistence between heterogeneous communication technologies (e.g., LTE-V2X and NR-V2X) may be achieved by requiring the satisfaction of predefined conditions in the usage of resources shared between the heterogeneous communication technologies in the same frequency band. Furthermore, a numerology and/or synchronization reference/source for the use of the shared resources may be predefined to minimize interference between the heterogeneous communication technologies on the shared resources. Accordingly, the heterogeneous communication technologies may use the same frequency band more efficiently.

Communication System Example to which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 14:
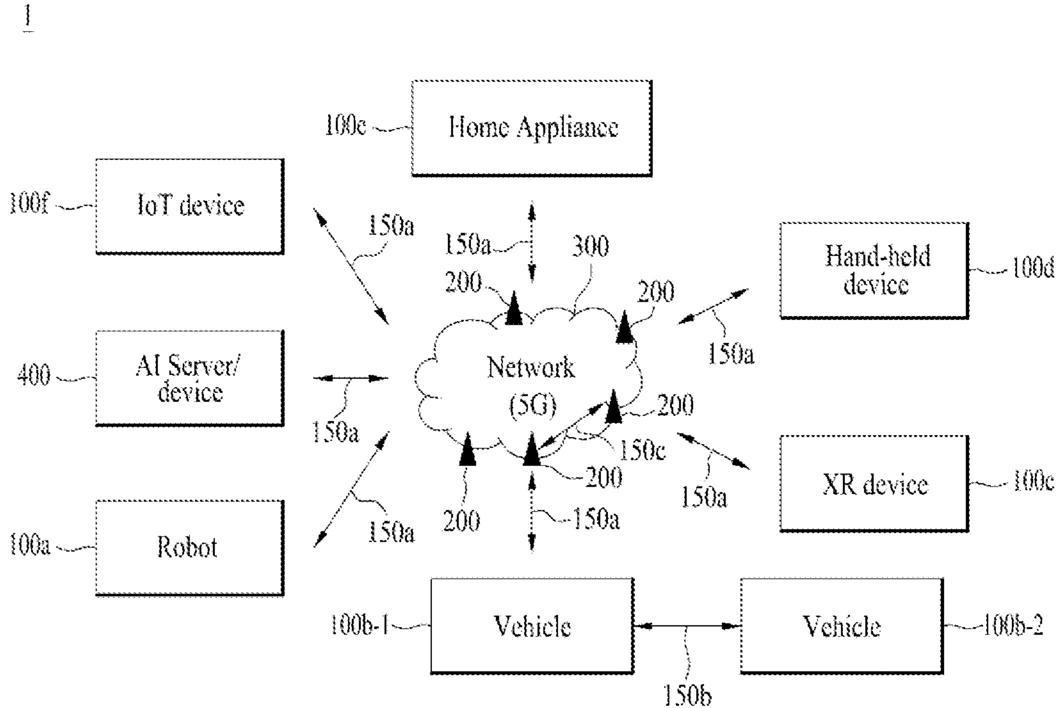
FIG. 14 illustrates a communication system applied to the present disclosure.

FIG. 14 illustrates a communication system applied to the present disclosure.

Referring to FIG. 14, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an extended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 15:
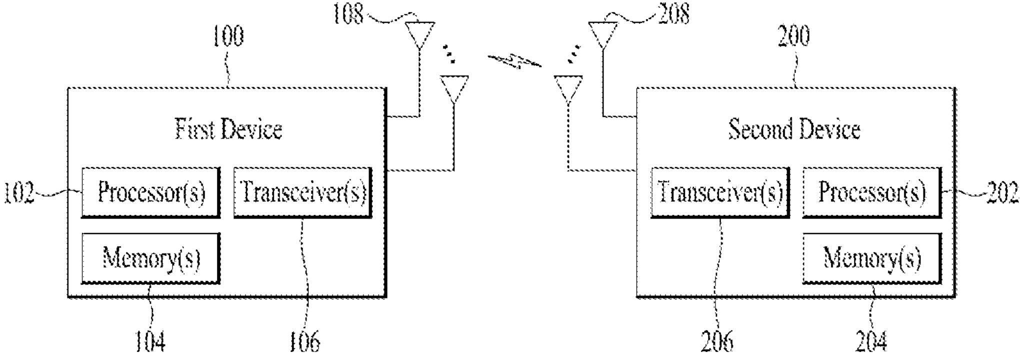
FIG. 15 illustrates wireless devices applicable to the present disclosure.

FIG. 15 illustrates a wireless device applicable to the present disclosure.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 14.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

Specifically, the first wireless device 100 or a first UE may include the processor(s) 102 connected to the RF transceiver(s) and the memory(s) 104. The memory(s) 104 may include at least one program for performing operations related to the embodiments described in FIGS. 11 to 13 (for example, in consideration of at least one of ALT #1 to ALT #9).

The processor(s) 102 may control the RF transceiver(s) to receive configuration information related to a first resource and a second resource, determine at least one resource for first SL communication among the first resource and the second resource, and perform the first SL communication on the at least one resource. The second resource may be a resource shared between the first SL communication and second SL communication based on a second wireless technology. Whether the second resource is included in the at least one resource may be determined based on quality information related to the first resource. The processor(s) 102 may perform the operations described in FIGS. 11 to 13 (for example, in consideration of at least one of ALT #1 to ALT #9) based on the program included in the memory(s) 104.

Alternatively, a chipset including the processor(s) 102 and the memory(s) 104 may be configured. The chipset may include: at least one processor; and at least one memory operably connected to the at least one processor and configured to, when executed, cause the at least one processor to perform operations. The operations may include: receiving configuration information related to a first resource and a second resource: determining at least one resource for first SL communication among the first resource and the second resource; and performing the first SL communication on the at least one resource. The second resource may be a resource shared between the first SL communication and second SL communication based on a second wireless technology. Whether the second resource is included in the at least one resource may be determined based on quality information related to the first resource. The operations may include the operations described in FIGS. 11 to 13 (for example, in consideration of at least one of ALT #1 to ALT #9) based on the program included in the memory(s) 104.

Alternatively, a computer-readable storage medium including at least one computer program that causes the processor(s) 102 to perform operations may be provided. The operations may include: receiving configuration information related to a first resource and a second resource: determining at least one resource for first SL communication among the first resource and the second resource; and performing the first SL communication on the at least one resource. The second resource may be a resource shared between the first SL communication and second SL communication based on a second wireless technology. Whether the second resource is included in the at least one resource may be determined based on quality information related to the first resource. The operations may include the operations described in FIGS. 11 to 13 (for example, in consideration of at least one of ALT #1 to ALT #9) based on the program included in the memory(s) 104.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Specifically, the second wireless device 200 or a second UE may include the processor(s) 202 connected to the RF transceiver(s) and the memory(s) 204. The memory(s) 204 may include at least one program for performing operations related to the embodiments described in FIGS. 11 to 13.

The processor(s) 102 may control the RF transceiver(s) to receive configuration information related to a first resource and a second resource and receive a first SL signal on at least one resource of the first resource and the second resource. The second resource may be a resource shared between first SL communication based on a first wireless technology and second SL communication based on a second wireless technology. Whether the second resource is included in the at least one resource may be determined based on quality information related to the first resource. The processor(s) 202 may perform the operations described in FIGS. 11 to 13 based on the program included in the memory(s) 204.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 16:
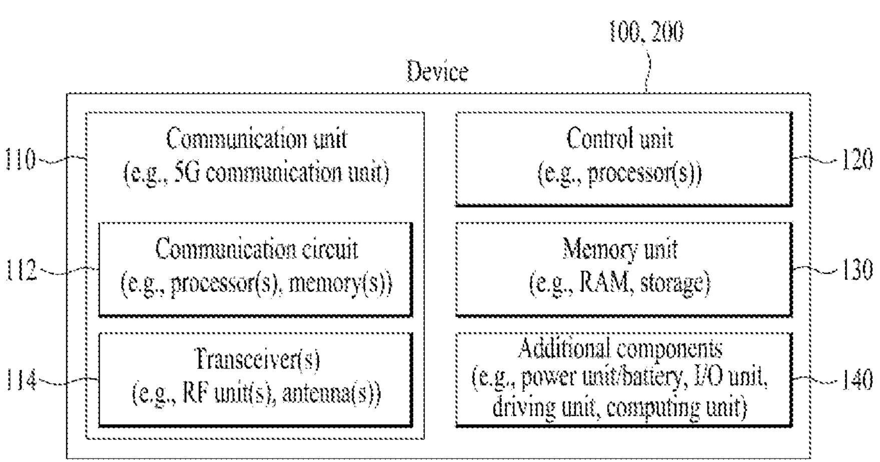
FIG. 16 illustrates another example of a wireless device to which the present disclosure is applied.

FIG. 16 illustrates another example of a wireless device applied to the present disclosure. The wireless device may be implemented in various forms according to a use-case/service (refer to FIG. 17).

Referring to FIG. 16, wireless devices 100 and 200 may correspond to the wireless devices 100 and 200 of FIG. 15 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 14), the vehicles (100*b*-1 and 100*b*-2 of FIG. 14), the XR device (100*c* of FIG. 14), the hand-held device (100*d* of FIG. 14), the home appliance (100*e* of FIG. 14), the IoT device (100*f* of FIG. 14), a digital broadcast terminal, a hologram device, a public safety device, an MTC device, a medicine device, a fintech device (or a finance device), a security device, a climate/environment device, the AI server/device (400 of FIG. 14), the BSs (200 of FIG. 14), a network node, etc. The wireless device may be used in a mobile or fixed place according to a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 17:
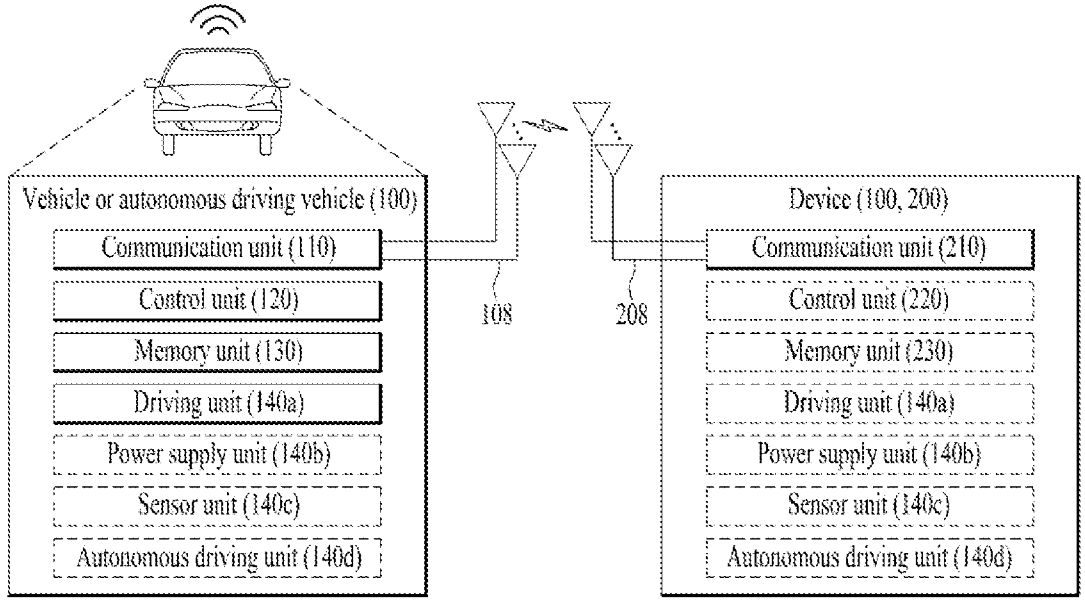
FIG. 17 illustrates a vehicle or an autonomous driving vehicle applied to the present disclosure.

Examples of Vehicles or Autonomous Vehicles to which the Present Disclosure is Applied FIG. 17 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 17, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the acquired data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names. Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure.

INDUSTRIAL APPLICABILITY

The above-described embodiments of the present disclosure are applicable to various mobile communication systems.

The invention claimed is:

1. A method performed by a first user equipment (UE), the method comprising:

receiving configuration information related to a resource pool including a first resource and a second resource;

receiving downlink control information for scheduling of a first sidelink signal based on a first wireless technology;

determining at least one resource among the resource pool based on the downlink control information; and transmitting the first sidelink signal on the at least one resource, wherein the second resource is a resource shared for first sidelink communication based on the first wireless technology and second sidelink communication based on a second wireless technology, wherein whether the second resource is included in the at least one resource is determined based on quality information related to the first resource, and wherein, based on that the quality information is less than or equal to a predetermined threshold quality, the first sidelink signal is transmitted on the second resource based on a numerology related to the second sidelink communication or a synchronization reference related to the second sidelink communication.

2. The method of claim 1, wherein the quality information is related to a channel busy ratio (CBR) measured for the first resource or a channel occupancy ratio (CR) measured for the first resource.

3. The method of claim 2, wherein based on that the CBR measured for the first resource or the CR measured for the first resource is less than or equal to a predetermined threshold quality, the at least one resource includes the second resource.

4. The method of claim 1, wherein the quality information is related to at least one of a number of negative acknowledgment (NACK) occurrences, a number of discontinuous transmission (DTX) occurrences, or a number of radio link failure (RLF) occurrences.

5. The method of claim 4, wherein based on that the number of NACK occurrences related to the first resource, the number of DTX occurrences related to the first resource, or the number of RLF occurrences related to the first resource is more than a predetermined threshold number, the at least one resource includes the second resource.

6. The method of claim 1, wherein the quality information is related to a rate or frequency at which reselection of a booking process related to the first sidelink communication based on the first wireless technology performed on the first resource is triggered.

7. The method of claim 1, further comprising:

obtaining measurement information for the second resource; and determining whether the measurement information satisfies predetermined conditions.

8. The method of claim 7, wherein the at least one resource includes the second resource based on (i) that the measurement information satisfies the predetermined conditions and (ii) that the quality information is less than or equal to a predetermined threshold quality.

9. The method of claim 7, wherein the measurement information includes at least one of a sidelink received signal strength indicator (S-RSSI), a channel busy ratio (CBR), a channel occupancy ratio (CR), or a reference signal received power (RSRP), which are all measured for the second resource.

10. The method of claim 1, wherein the first wireless technology is New Radio (NR), wherein the second wireless technology is Long Term Evolution (LTE), and wherein the first resource is a resource configured to be available only for the first sidelink communication.

11. A method of performed by a second user equipment (UE), the method comprising:

receiving configuration information related to a resource pool including a first resource and a second resource; and receiving a first sidelink signal based on a first wireless technology on at least one resource among the resource pool, wherein the second resource is a resource shared for first sidelink communication based on the first wireless technology and second sidelink communication based on a second wireless technology, wherein whether the second resource is included in the at least one resource is determined based on quality information related to the first resource, and wherein, based on that the quality information is less than or equal to a predetermined threshold quality, the first sidelink signal is received on the second resource based on a numerology related to the second sidelink communication or a synchronization reference related to the second sidelink communication.

12. A first user equipment (UE) comprising:

a radio frequency (RF) transceiver; and a processor connected to the RF transceiver, wherein the processor is configured to:

control the RF transceiver to receive configuration information related to a resource pool including a first resource and a second resource;

receive downlink control information for scheduling of a first sidelink signal based on a first wireless technology;

determine at least one resource among the resource pool based on the downlink control information; and transmit the first sidelink signal on the at least one resource, wherein the second resource is a resource shared for first sidelink communication based on the first wireless technology and second sidelink communication based on a second wireless technology, wherein whether the second resource is included in the at least one resource is determined based on quality information related to the first resource, and wherein, based on that the quality information is less than or equal to a predetermined threshold quality, the first sidelink signal is transmitted on the second resource based on a numerology related to the second sidelink communication or a synchronization reference related to the second sidelink communication.

13. A second user equipment (UE) comprising:

a radio frequency (RF) transceiver; and a processor connected to the RF transceiver, wherein the processor is configured to:

control the RF transceiver to receive configuration information related to a resource pool including a first resource and a second resource; and receive a first sidelink signal based on a first wireless technology on at least one resource among the resource pool, wherein the second resource is a resource shared for first sidelink communication based on the first wireless technology and second sidelink communication based on a second wireless technology, wherein whether the second resource is included in the at least one resource is determined based on quality information related to the first resource, and wherein based on that the quality information is less than or equal to a predetermined threshold quality, the first sidelink signal is received on the second resource based on a numerology related to the second sidelink communication or a synchronization reference related to the second sidelink communication.

* * * * *